US010317904B2

(12) United States Patent
Tu

(10) Patent No.: US 10,317,904 B2
(45) Date of Patent: Jun. 11, 2019

(54) UNDERWATER LEADING DRONE SYSTEM

(71) Applicant: Pinnacle Vista, LLC, Upland, CA (US)

(72) Inventor: Haofeng Tu, Shanghai (CN)

(73) Assignee: Pinnacle Vista, LLC, Upland, CA (US)

( * ) Notice: Subject to any disclaimer, the term of this patent is extended or adjusted under 35 U.S.C. 154(b) by 0 days.

(21) Appl. No.: 15/588,302

(22) Filed: May 5, 2017

(65) Prior Publication Data
US 2018/0321680 A1 Nov. 8, 2018

(51) Int. Cl.
| G05D 1/00 | (2006.01) |
| G08C 17/02 | (2006.01) |
| H04W 64/00 | (2009.01) |
| B64C 39/02 | (2006.01) |
| B64D 3/00 | (2006.01) |

(Continued)

(52) U.S. Cl.
CPC .......... *G05D 1/0088* (2013.01); *B63G 8/001* (2013.01); *B64C 39/024* (2013.01); *B64D 3/00* (2013.01); *G05D 1/0011* (2013.01); *G08C 17/02* (2013.01); *H04W 24/02* (2013.01); *H04W 64/003* (2013.01); *B63B 2203/00* (2013.01); *B63G 2008/005* (2013.01); *B64C 2201/126* (2013.01);

(Continued)

(58) Field of Classification Search
CPC .............. B63G 8/001; B63G 2008/002; B63G 2008/004; B63G 2008/005; B63G 2008/007; B64C 39/024; B64C 39/028; B64C 2201/12; B64C 2201/121; B64C 2201/122; B64C 2201/123; B64C 2201/125; B64C 2201/126; B64C 2201/127; B64C 2201/128; B64C 2201/146; B64C 2201/148; B64D 3/00; B64D 3/02
See application file for complete search history.

(56) References Cited

U.S. PATENT DOCUMENTS 4,890,751 A * 1/1990 Opdahl ................... B64D 3/02
  212/271
4,962,488 A * 10/1990 Dell-Imagine ........... H01Q 1/04
  343/709

(Continued)

FOREIGN PATENT DOCUMENTS

WO WO-2008096376 A1 * 8/2008 ........... G01C 21/005

OTHER PUBLICATIONS

Office action from related U.S. Appl. No. 15/588,282.

*Primary Examiner* — Thomas G Black
*Assistant Examiner* — Sara J Lewandroski
(74) *Attorney, Agent, or Firm* — WPAT, P.C., Intellectual Property Attorneys; Anthony King

(57) ABSTRACT

Systems and methods are provided for least one leading drone configured to move to a leading drone future location based on a future location of a base station. A set of base station future locations may form a base station path for the base station to traverse. Also, a set of leading drone future locations may form a leading drone path for the leading drone to traverse. The base station's future location may be anticipated from a prediction or a predetermination. The leading drone, navigating along the leading drone path, may collect sensor data and/or perform tasks. The leading drone may interact with sensor drones while traversing the leading drone path. Accordingly, the leading drone may move ahead of the base station in motion, as opposed to following or remaining with the base station.

13 Claims, 21 Drawing Sheets

(51) Int. Cl.
   *B63G 8/00* (2006.01)
   *H04W 24/02* (2009.01)
   *H04W 84/00* (2009.01)

(52) U.S. Cl.
   CPC .. *B64C 2201/141* (2013.01); *B64C 2201/146* (2013.01); *H04W 84/005* (2013.01)

(56) References Cited

U.S. PATENT DOCUMENTS

| | | | |
|---|---|---|---|
| 5,045,216 A * | 9/1991 | Eller | E02B 15/046 |
| | | | 210/776 |
| 5,340,056 A | 8/1994 | Guelman et al. | |
| 5,521,817 A | 5/1996 | Burdoin et al. | |
| 6,122,572 A | 9/2000 | Yavnai | |
| 7,451,023 B2 | 11/2008 | Appleby et al. | |
| 7,673,831 B2 | 3/2010 | Steele et al. | |
| 8,464,816 B2 | 6/2013 | Carrier | |
| 8,570,150 B1 | 10/2013 | Bowen et al. | |
| 8,682,485 B2 | 3/2014 | Anhalt et al. | |
| 8,973,860 B2 | 3/2015 | Beard | |
| 9,056,676 B1 * | 6/2015 | Wang | B64F 1/00 |
| 9,590,298 B1 | 3/2017 | Buchmueller et al. | |
| 2005/0183569 A1 * | 8/2005 | Solomon | B64C 39/024 |
| | | | 89/1.11 |
| 2006/0074557 A1 * | 4/2006 | Mulligan | G05D 1/0094 |
| | | | 701/13 |
| 2012/0250010 A1 | 10/2012 | Hannay | |
| 2013/0062464 A1 * | 3/2013 | Speer | B64D 3/00 |
| | | | 244/1 TD |
| 2015/0047420 A1 * | 2/2015 | Nedwed | G01C 13/00 |
| | | | 73/54.36 |
| 2015/0334768 A1 | 11/2015 | Ranasinghe et al. | |
| 2016/0016663 A1 | 1/2016 | Stanek et al. | |
| 2016/0040968 A1 * | 2/2016 | Jeng | F42B 19/01 |
| | | | 114/312 |
| 2016/0083115 A1 | 3/2016 | Hess | |
| 2016/0129999 A1 * | 5/2016 | Mays | B64C 39/024 |
| | | | 701/2 |
| 2016/0214717 A1 * | 7/2016 | De Silva | B64D 5/00 |
| 2016/0340842 A1 | 11/2016 | Adams | |
| 2016/0363929 A1 | 12/2016 | Clark et al. | |
| 2016/0381541 A1 | 12/2016 | Akopian et al. | |
| 2017/0052539 A1 | 2/2017 | Kerzner | |
| 2017/0069214 A1 | 3/2017 | Dupray et al. | |
| 2017/0082593 A1 * | 3/2017 | Nedwed | G01N 33/2823 |
| 2017/0150373 A1 | 5/2017 | Brennan et al. | |
| 2017/0161972 A1 | 6/2017 | Maloney et al. | |
| 2017/0301234 A1 * | 10/2017 | Park | G08G 1/094 |
| 2018/0032071 A1 * | 2/2018 | Wieneke | G05D 1/0027 |
| 2018/0050797 A1 * | 2/2018 | Palmer | B64C 39/022 |
| 2018/0075759 A1 * | 3/2018 | Kim | G08G 5/0069 |

* cited by examiner

UNDERWATER LEADING DRONE SYSTEM

FIELD

The present application relates generally to unpiloted devices such as drones, and more specifically to a system of a leading drone that navigates based on base station movement.

BACKGROUND

Drones are unpiloted devices and may be used by the military, police, rescue, scientific, and commercial communities. One example of a drone is an unmanned device capable of controlled, sustained, and powered movement. As such, the designs of drones may consist of vehicles, aircraft, boats, submarines or spacecraft of various sizes, capabilities, and weights. A typical drone consists of a propulsion device, such as an engine, a navigation system, one or more sensors, and possibly cargo. For an aircraft or aerial drone, the sensors may provide information to a ground observer about the terrain the drone overflies, such as video information about a lost hiker in a rescue application, information from laser and/or biological sensors about environmental conditions in a scientific or security application, or a combination of video, laser, biological and other sensors concerning battlefield conditions in a military application. The cargo may be munitions, food, medicine, and/or other goods depending on the mission of the drone.

As the drone is unmanned, computer software executing on one or more processors aboard the drone partially or completely controls the drone. The computer software may control the various functions performed by the drone, perhaps with the aid of an observer.

There continues to be a need for expanded capabilities of unmanned aerial drones.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter in this specification are set forth in the accompanying drawings and the description below. Other features, aspects, and advantages will become apparent from the description, the drawings, and the claims. Note that the relative dimensions of the following figures may not be drawn to scale.

In a particular embodiment, a system including a leading drone is disclosed. The leading drone is configured to identify a base station configured to move from a current location, determine a future location of the base station, and move to a drone location relative to the future location.

In another particular embodiment, the drone location is at the future location.

In another particular embodiment, the leading drone is configured to move to a location where the base station has traveled on, such that the leading drone travels on the same traveling path as the base station, only lagging behind in either distance or time.

In another particular embodiment, the leading drone is configured to receive a control signal from the base station including the future location.

In another particular embodiment, the leading drone is configured to determine the future location based on the current location.

In another particular embodiment, the leading drone is configured to determine a base station path between the current location and the future location, and move along a drone path relative to the base station path.

In another particular embodiment, the leading drone is configured to determine the future location along a base station path that includes the current location.

In another particular embodiment, the leading drone is configured to determine a drone path relative to the base station path.

In another particular embodiment, the drone path is parallel to the base station path.

In another particular embodiment, the drone path crisscrosses the base station path.

In another particular embodiment, the drone path circles the base station as the base station traverses the base station path.

In another particular embodiment, the leading drone is configured to receive a control signal from the base station that includes the base station path.

In another particular embodiment, the leading drone includes a sensor. The leading drone is configured to: collect sensor data along the base station path using the sensor; identify a trigger based on the sensor data; and move to a trigger location based on the trigger.

In another particular embodiment, the leading drone is configured to return to the drone path.

In another particular embodiment, the sensor is a directional radar.

In another particular embodiment, the leading drone is configured to scan for sensory data across the base station path.

In another particular embodiment, the leading drone is configured to travel along the drone path ahead of the base station.

In another particular embodiment, the leading drone is configured to travel along the drone path alongside the base station.

In another particular embodiment, the leading drone is configured to travel along the drone path behind the base station.

In another particular embodiment, the leading drone comprises a sensor. The leading drone is configured to: collect sensor data along the drone path using the sensor; retrieve geographical data from a data store; and cross reference the sensor data with the geographical data to produce updated geographical data.

In another particular embodiment, the leading drone is configured to send the updated geographical data to the base station.

In another particular embodiment, base station is a land vehicle and the leading drone is an unmanned aerial vehicle.

In another particular embodiment, the leading drone is configured to determine the future location relative to received geographical data.

In another particular embodiment, the leading drone is configured to receive a control signal from the base station for control of the leading drone.

In another particular embodiment, the leading drone is configured to receive an override signal that overrides the control signal and controls the leading drone.

In another particular embodiment, the system includes a second leading drone, the second leading drone configured to receive the override command that controls the second leading drone.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
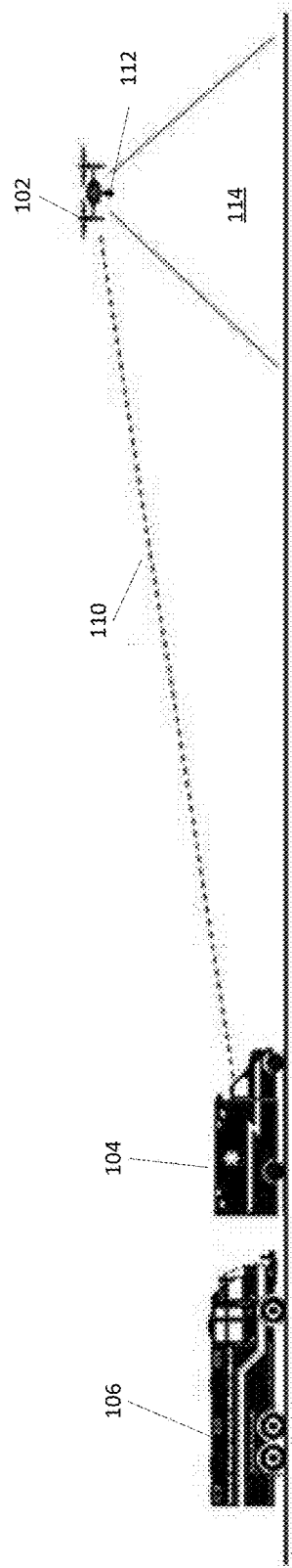
FIG. 1 illustrates an example of a leading drone interacting with a base station as part of a convoy of vehicles.

Generally described, aspects of the present disclosure relate to systems and methods for at least one leading drone configured to move to a leading drone future location based on a future location of a base station. A set of base station future locations may form a base station path for the base station to traverse. Also, a set of leading drone future locations may form a leading drone path for the leading drone to traverse. The paths may be in a substantially two-dimensional space (such as over land) or in three-dimensional space (such as in the air or under water). The base station's future location may be anticipated from a prediction or a predetermination. For example, the base station's anticipated traversal along a base station path may encompass predicted future traversals (such as a prediction based upon current and/or past traversals) and/or predetermined future traversals (such as configuration for performance of a traversal at a future time that are stored in, and retrieved from, a data store). Accordingly, the leading drone may move ahead of the base station in motion, as opposed to following or remaining with the base station.

In this specification, drones include any unmanned vehicle, such as an unmanned aerial vehicles (UAV), unpiloted aerial vehicle, remotely piloted aircraft, unmanned aircraft systems, any aircraft covered under Circular 328 AN/190 classified by the International Civil Aviation Organization, and so on. As an example, the drone may be in the form of a single or multi-rotor copter (e.g., a quad-copter) or a fixed wing aircraft. In addition, certain aspects of the disclosure can be utilized with drones in the form of other types of unmanned vehicles (e.g., wheeled, tracked, and/or water vehicles).

The leading drone, navigating along the leading drone path, may collect sensor data and/or perform tasks. Examples of tasks include providing a base station with information concerning a base station path for traversal or to execute a navigational pattern traversing a leading drone path. The sensor data may be collected from sensors accessible to (e.g., mounted on or in) the leading drone. The sensors may be directional sensors that may sense in a particular direction (such as a camera configured to capture a field of view) or omnidirectional sensors that do not sense in a particular direction. Directional sensors may be configured to move and scan an area over time, such as by rotating 360 degrees along one or two axes. The sensor data may be cross referenced with stored or known sensor data, such as known geographical data or landmarks that the leading drone's sensors would be expected to identify. As the leading drone navigates along the leading drone path, the sensor data may be captured from various perspectives relative to the base station, such as in front of, behind, above, or alongside the base station. For example, the leading drone may collect sensor data from behind the base station to ensure that there is no vehicle following the base station, or may collect sensor data ahead of the base station to make sure there are no obstacles that would affect the base station's traversal of the base station path. This combination may produce more robust sensor data that combines both the known or stored sensor data with the current or new sensor data collected by the leading drone traversing the leading drone path. Accordingly, a leading drone may send this combined sensor data to a base station and/or autonomously provide the base station with advantageous sensor data not available from the vantage point of the base station or perform tasks that the base station would not be able to perform.

In certain embodiments, the leading drone may perform a task, such as changing its leading drone path, when autonomously triggered based on collected sensor data or when commanded by a control signal received from a base station. After performance of the triggered task, the leading drone may return to the leading drone path and begin from where the leading drone path was interrupted due to the triggered task. Alternatively, after performance of the triggered task, the leading drone may continue along the leading drone path starting from a leading drone future location that the leading drone had planned on traversing at the time of triggered task completion. In certain embodiments, multiple leading drones may be utilized to identify and respond to multiple triggers.

In certain embodiments, a base station may be configured for autonomous navigation based on the leading drone sensor data. For example, the base station may be an autonomous driving vehicle that utilizes the leading drone's sensor to navigate along the base station path. Utilizing sensor data from the leading drone may be advantageous in situations where leading drone sensors are able to collect sensor data from areas that are not accessible to sensors onboard the base station. For example, a sensor such as a video camera on a base station may be limited to sense areas around the base station within a line of sight of the video camera, while a video camera sensor mounted on a leading drone may be able to sense areas beyond the base station video camera sensor's line of sight.

In certain embodiments, processors onboard the base station may offload processing tasks to the leading drone for processing by leading drone processors. For example, sensor data captured by the leading drone may first be processed at the leading drone and the analysis from the sensor data sent to the base station rather than sending the raw sensor data to the base station.

The leading drones may be part of a leading drone network that includes leading drones, base stations, and/or sensor drones. For example, a single base station may interact with multiple leading drones. Each of the multiple leading drones may interact with multiple sensor drones. Accordingly, the base station may benefit from sensor data collected from multiple leading drones and multiple sensor drones. Also, a leading drone may interact with multiple base stations, such as where the navigational activity of multiple base stations may configure the leading drone to undertake specific a leading drone path.

As described, the leading drone may interact with sensor drones while traversing the leading drone path. The sensor drones may be stationary or configured for motion. The sensor drones may transfer sensor drone sensor data to the leading drone to further augment the leading drone's sensory capabilities. For example, a sensor drone may traverse an area and deploy sensors to characterize the vicinity of the traversed area to generate sensor drone sensor data. The generated sensor drone sensor data may be stored by the sensor drone. The sensor drone may transfer stored sensor drone sensor data during the traversal, such as historical environmental data collected by the sensor drone's sensors, to the leading drone when the leading is within a distance at which the sensor drone's communication systems operate. Accordingly, the leading drone may advantageously augment its collection of sensory data while traversing the leading drone path.

In certain embodiments, the leading drone may control a sensor drone. This may be active control of the sensor drone by the leading drone. For example, an underwater sensor drone may be physically tethered to an aerial leading drone so that the leading drone can propel, or drag, the underwater drone across an area underwater to collect underwater sensor drone sensor data in that area.

FIG. 1 illustrates an example of a leading drone 102 interacting with a base station 104. The base station 104 may be part of a convoy of vehicles 104, 106. The leading drone 102 may communicate with the base station via a leading drone communication link 110. Although the base station is illustrated as a vehicle in FIG. 1, the base station can be in any form factor that can establish a communication link 110 with the leading drone, such as a handheld device, personal computer, watercraft, or airplane.

The leading drone communication link 110 may include any type of communication protocol from which devices can communicate with each other, such as one or combinations of infrared (IR) wireless communication, broadcast radio, satellite communication, microwave wireless communication, microwave radio, radio frequency, wi-fi, Bluetooth, Zigbee, GPC, GSM, RFID, OFDM or the like. In certain embodiments, the leading drone communication link 110 may include one or more links of narrow band, wide band, or a combination of narrow or wide band communications. Also, the leading drone communication link 110 may include antennas of different types, such as directional and/or omnidirectional antennas.

The leading drone may have various sensors connected to it for data collection. For example, photographic cameras, video cameras, infra-red cameras, multispectral cameras, lidar, radio transceiver, sonar, and TCAS (traffic collision avoidance system). In the illustrated embodiment, the leading drone 102 includes a video camera 112 configured to survey an area 114 underneath the base station 102 within a field of view of the camera 112.

As will be explained in more details later, the leading drone 102 may be configured to move to leading drone future locations along a leading drone path based on a future location of the base station (which may be along a base station path). Accordingly, the leading drone may remain ahead of a base station while the base station is moving, rather than behind or alongside a moving base station.

In certain embodiments, multiple base stations 104, 106 may interact with the leading drone 102. For example, the leading drone 102 may be configured to navigate based on a future location of the first base station 104 during one time interval but then be configured to navigate based on a future location of the second base station 106 at a second time interval. This example may occur after the first leading drone 104 stops moving or is out of commission due to a car crash.

The leading drone 102 may autonomously remain in a position at a set distance ahead of the base station 104 based on where the base station 104 will be, rather than where the base station 104 is or has been. The base station may remain in communication with the leading drone, allowing the base station to send commands to the leading drone. For example, the commands may include modifications to the leading drone path or to perform specific tasks. These tasks may include surveying landscapes, waterways, or airspaces ahead of the base station for danger such as rocks in the water, floating objects in the water, icebergs in water, wash-out roads, downed powerlines, downed trees, refugees in water, extreme weather conditions; search and rescue operations; dropping medical supplies, food supplies, life jackets, and life savers to people in water; taking and transmitting aerial photos and videos; searching for schools of fish or game; or searching for oil spills. In certain embodiments, the leading drone 102 may be equipped with sensors to search, locate and identify people or animals on the ground that may need assistance, or that may be hostile to the base station 104 or the convoy of vehicles 104, 106.

The leading drone 102 may have access to an obstacle avoidance system so the leading drone 102 can avoid crashing into obstacles such as buildings, trees, utility poles, and power lines. The obstacle avoidance system can compare readily available data (e.g., 3-D maps, Google® Maps data produced by Google Inc. headquartered in Mountain View, Calif., or satellite images) with data the leading drone has collected from the sensors (e.g., via visual image/video detection, visual sensors and computation/processing, lidar, radar, sonar, infrared sensor) to map out potential obstacles to avoid.

In certain embodiments, the leading drone 102 may include tools to perform a task. The tools may include passive devices that do not manipulate objects around the leading drone, such as a sensor, or active devices that can manipulate an area around a leading drone, such as a laser or spot light to identify objects for ground support personnel or a loud speaker to transmit sounds generated at the base station through the loud speakers to targets in an areas being surveyed.

In certain embodiments, the leading drone 102 may land on the base station 104 on demand or may land on a moving vehicle for storage, recharging or maintenance.

In certain embodiments, other vehicles in the convoy other than the base station may be an alternate base station. For example, if the base station 104 is out of commission (for example, due to a car crash) the leading drone may interact (e.g., determine the leading drone path based on an anticipated base station path and/or send leading drone sensor data to the base station) with the other vehicle in the convoy as an alternate base station 106. These alternate base stations may have an order of priority such that the leading drone communicates with the highest priority alternate base station among available alternate base stations within range of the leading drone's communication systems. These priorities may be based upon various criteria (e.g., time of day, alternate base station paths, current payload of the leading drone) and may be autonomously determined by the leading drone or received by the leading drone via a control signal from a base station.

In certain embodiments, the nodes or communication points (e.g., base station, leading drone, sensor drone) can optionally have a communication module using LTE, satellite, or any wireless communication capability (hardware and/or software) currently known or to be developed in the future. Having this optional connectivity can further ensure optimal, reliable, and timely real-time connectivity of any of these nodes of the leading drone network to each other within the leading drone network, or to ensure optimal, reliable, and timely real-time connectivity to others (e.g., a command center such as a police station located remotely and communicable with the nodes over a network such as the Internet).

In certain embodiments, the nodes of the leading drone network can select (either autonomously or non-autonomously), in real time, different communication types. This selection can be based on criteria such as cost of transmission, reliability of transmission, speed of transmission, reception of transmission, or security of the transmission. Also, the nodes of the leading drone network may also have communication modules that support LTE and satellite communication either as a primary or a supplementary mode of communication. For example, as the base station, leading drone, and/or sensor drone travels through regions amenable to certain types of communication protocols (such as LTE), the base stations, leading drones, and/or sensor drones would operate with different communication protocols (such as LTE), for reasons such as lower cost of communication and/or higher reliability in a low-altitude airspace. In certain embodiments, a communication type can be selected that enables an external actor, such as a command post or headquarters located remotely in a different city, to communicate in real time with the nodes of the leading drone network. Such communication may allow the external actor to receive, in real time, audio/video data captured by the leading drone or to send commands for the leading drone to perform a task.

Figure 2:
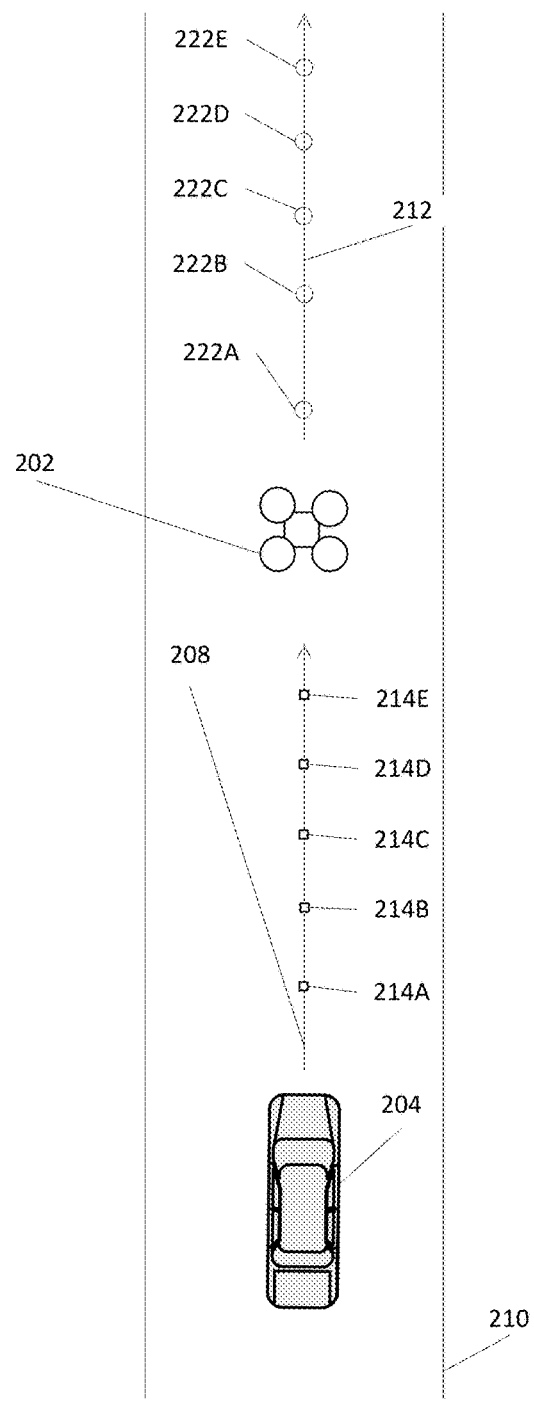
FIG. 2 illustrates an example of a leading drone oriented relative to a base station.

FIG. 2 illustrates an example of a leading drone 202 oriented relative to a base station 204. The base station 204 may be traveling along a base station path 208 that is parallel to and bound within a landmark such as a road 210. The base station path 208 may include multiple base station future locations 214A-E to be traversed over a time period. The leading drone may be travelling along a leading drone path 212 that includes leading drone future locations 222A-E. These leading drone future locations may be based upon the base station future locations 214A-E and traversed over the same time period that the base station future locations 214A-E are to be traversed.

For example, as the base station 204 is anticipated to traverse the base station path 208, the base station 204 may move from base station future location 214A to base station future location 214B to base station future location 214C to base station future location 214D and to base station future location 214E. Accordingly, the leading drone 202 may be configured to traverse the leading drone path 212 by moving from leading drone future location 222A to leading drone future location 222B to leading drone future location 222C to leading drone future location 222D and to leading drone future location 222E. Timing at which the leading drone 202 traverses the leading drone path 212 may include being at leading drone future location 222A when the base station is anticipated to be at base station future location 214A, being at leading drone future location 222B when the base station is anticipated to be at base station future location 214B, being at leading drone future location 222C when the base station is anticipated to be at base station future location 214C, being at leading drone future location 222D when the base station is anticipated to be at base station future location 214D, and being at leading drone future location 222E when the base station is anticipated to be at base station future location 214E.

Each of the leading drone future locations may be a set distance or time ahead of the base station future locations. By being a set distance ahead, a leading drone future location may be a set distance separated from a base station future location along a direction that the base station is anticipated to travel. For example, leading drone future location 222A may be a set distance (such as 50 meters) ahead of base station future location 214A as determined by the direction at which the base station path 208 is traveling (indicated by the arrow at the end of the base station path 208). By being an amount of (or set) time ahead, a leading drone may be at a leading drone future location which is located where a base station future location is anticipated to be located at a future time. For example, leading drone future location 214A may be an amount of time ahead (such as 10 seconds) by being located at where the base station 204 is anticipated to be 10 seconds after traversing base station future location 214A.

The base station's 204 anticipated traversal along a base station path may encompass predicted future traversals (such as a prediction based upon current and/or past traversals) and/or predetermined future traversals (such as configuration for performance of a traversal at a future time). For example, the base station's future traversals may be predetermined, such as predetermined via a navigation module that configures the base station to traverse the base station future locations at future times. For example, the base station may have a geospatial sensor (e.g., GPS) that senses where the base station is. Then, based also on where its intended destination is relative to other geospatial information such as a map, a navigational module may plot a navigational path for the base station to traverse over time to arrive at the intended destination. Example navigational modules may include the Garmin® Navigator application produced by Garmin Ltd. headquartered in Olathe, Kans. or the Google® Maps Navigation application developed by Google Inc. headquartered in Mountain View, Calif.

Also, for example and as will be discussed further below in connection with FIG. 8, the base station's 204 anticipated base station path may be predicted from determining a difference between a base station past location and a base station current location during a past interval of time (such as over the last minute). The difference may be plotted as a base station path for traversal over a future interval of time (of a same duration as the past interval of time), ending at an anticipated/predicted base station future position and starting from the base station current location.

Accordingly, in the illustrated embodiment of FIG. 2, the leading drone 202 is configured to move (e.g., traverse) along a leading drone path 212. The leading drone path 212 may be along leading drone future locations 222A-E that are a set distance and time ahead of base station future locations 214A-E. The base station future locations 214A-E may be along a base station path 208 that the base station 204 is anticipated to traverse.

In certain embodiments, directional sensors onboard the leading drone 202 may be configured to perform a sweep of an area ahead of the leading drone or around the leading drone as the leading drone traverses a leading drone path, such as by rotating across 360 degrees of freedom across one or two axis or by sweeping side to side.

Figure 3A:
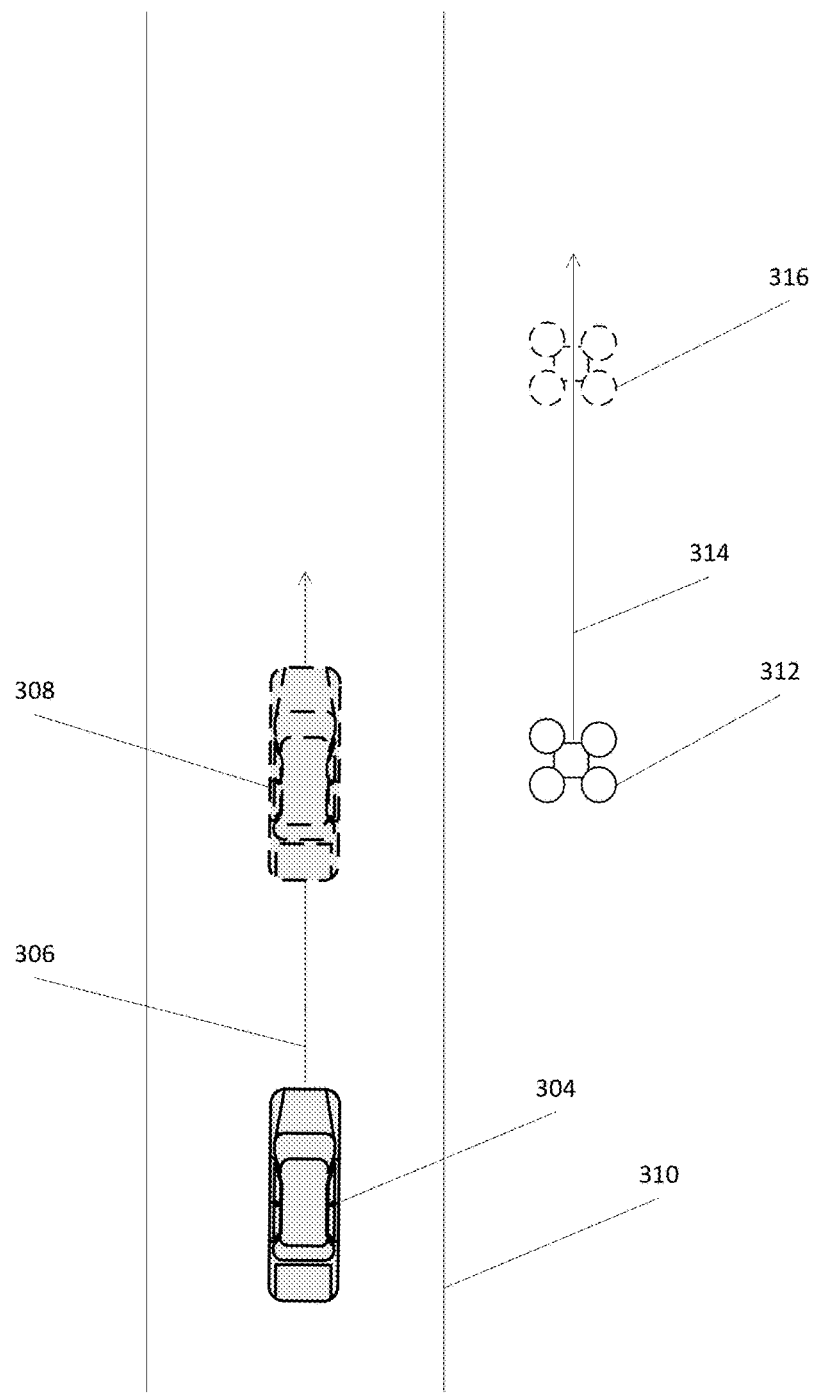
FIG. 3A illustrates an example of a leading drone oriented to a side of a base station.

FIG. 3A illustrates an example of a leading drone 302 oriented to a side of a base station 304. The base station 304 may be anticipated to traverse a base station path 306 with at least one base station future location 308 along the base station path. The base station path may be along a road 310 or other geographic landmark. The leading drone 312 may be configured to traverse a leading drone path 314 with at least one leading drone future location 316. The leading drone 312 traversing the leading drone path 314 may be ahead of the base station 304 in the direction of the base station path 306 (as indicated with the arrow of the base station path 306) but offset to a (right) side of the base station 304. The leading drone future location(s) 316 which outline the leading drone path may be based on the anticipated base station future locations 308, which outline the base station path 306.

In contrast to the embodiment illustrated in FIG. 2 where the leading drone 202 traverses a leading drone path 212 that is both a set distance and time ahead of the base station 204 (traversing the base station path 208) the embodiment illustrated in FIG. 3A shows how the leading drone 312 may be ahead of the base station 204 at a set distance but not a set time, or otherwise be offset to a side of the base station 304 traversing the base station path 306. The leading drone 312 may be configured to be at the leading drone future location 316 when the base station 304 is anticipated to be at the base station future location 308.

Figure 3B:
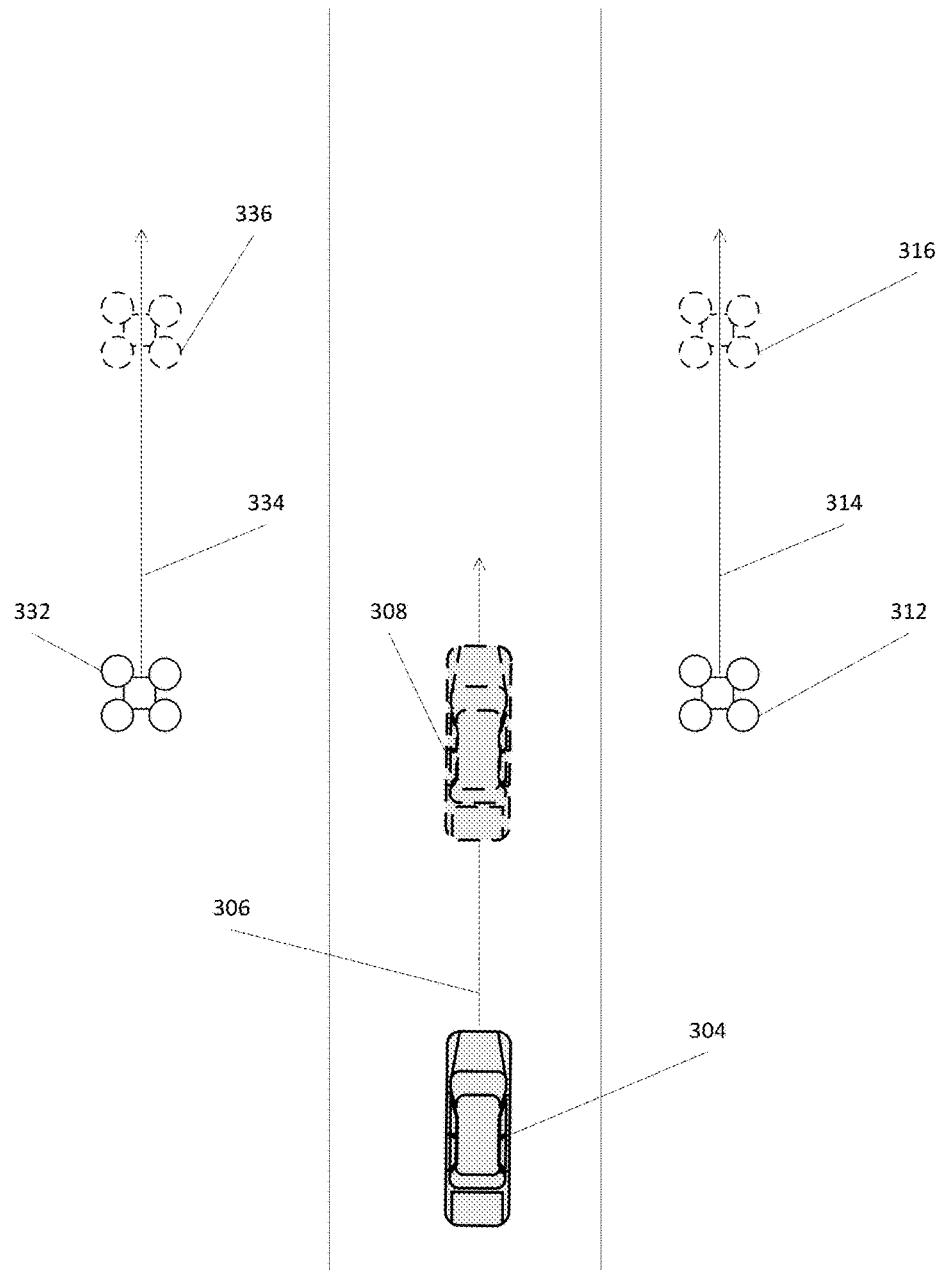
FIG. 3B illustrates an example of multiple leading drones on different sides of a base station.

FIG. 3B illustrates an example of multiple leading drones on different sides of the base station. FIG. 3B is similar to FIG. 3A except that another leading drone 332 may be configured to traverse a leading drone path 334 with at least one leading drone future location 336. The leading drone 332 traversing the leading drone path 334 may be ahead of the base station 304 in the direction of the base station path 306 (as indicated with the arrow of the base station path 306) but offset to a (left) side of the base station 304. Accordingly, the leading drone future location(s) 316 which define the leading drone path 314 and the leading drone future locations 336 which define the leading drone path 334 both may be based on the anticipated base station future locations 308 which define the base station path 306. The leading drones 312, 332 may be configured to be at the leading drone future locations 316, 336 when the base station 304 is anticipated to be at the base station future location 308.

Figure 3C:
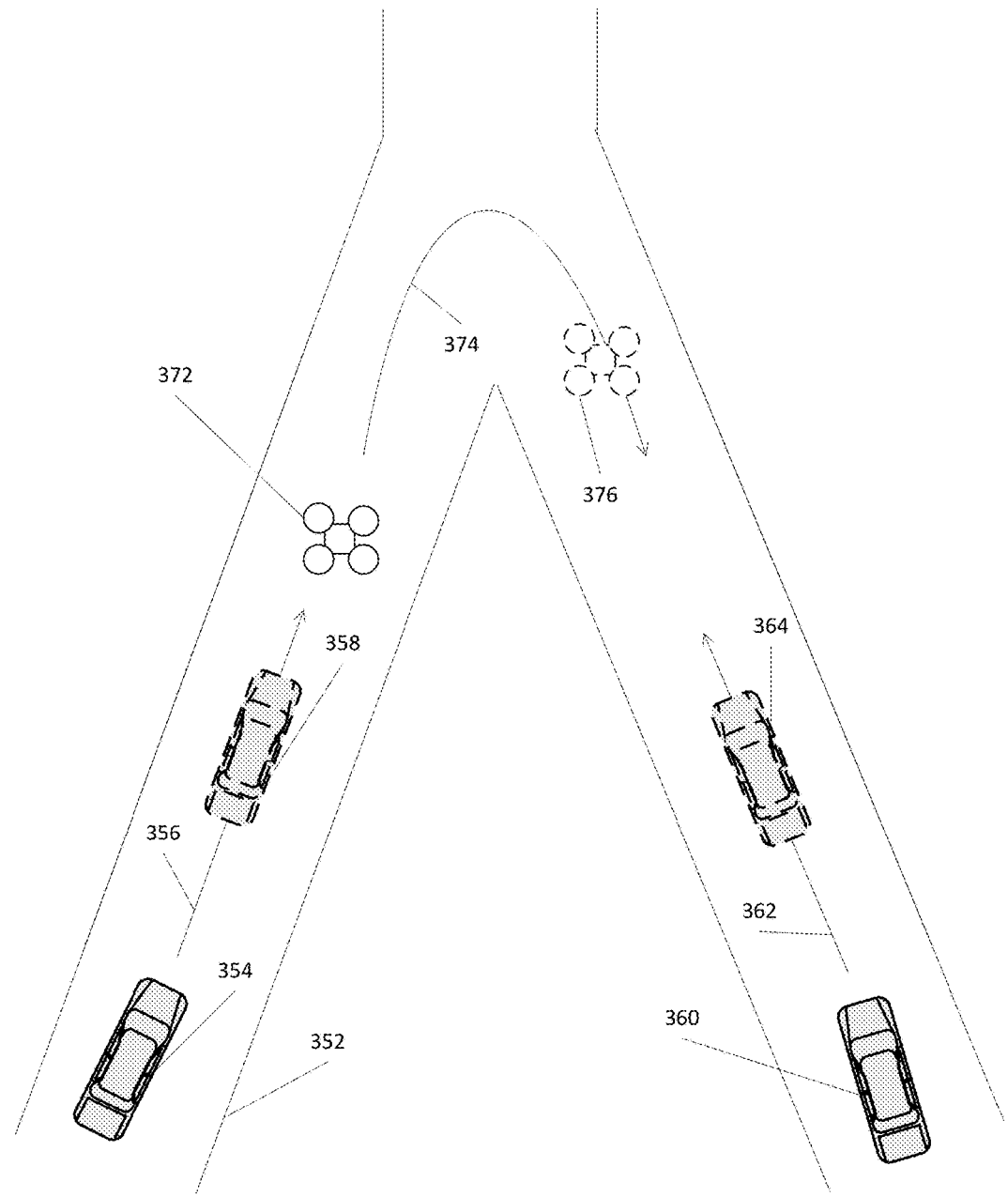
FIG. 3C illustrates an example of multiple base stations interacting with a single leading drone.

FIG. 3C illustrates an example of multiple base stations interacting with a single leading drone. The base stations 354, 360 may be anticipated to travel along base station paths 356, 362 with at least one base station future location 358, 364 respectively. The base station paths 356, 362 may be along a geographic landmark such as along prongs leading to a fork in a road 352. One leading drone 372 may be configured to travel along a leading drone path 374 initially ahead of one base station 354. However, the leading drone path 374 may be determined based on both base station paths 356, 362 (rather than a single base station path 356) such that leading drone future location 376 is based on both base station future locations 358, 364 (rather than a single base station future location 358). For example, the leading drone 372 may initially be configured to be ahead of the first base station 354 but, as the base station paths 356, 362 converge, the leading drone 372 may switch to be ahead of the second base station 360.

Figure 4:
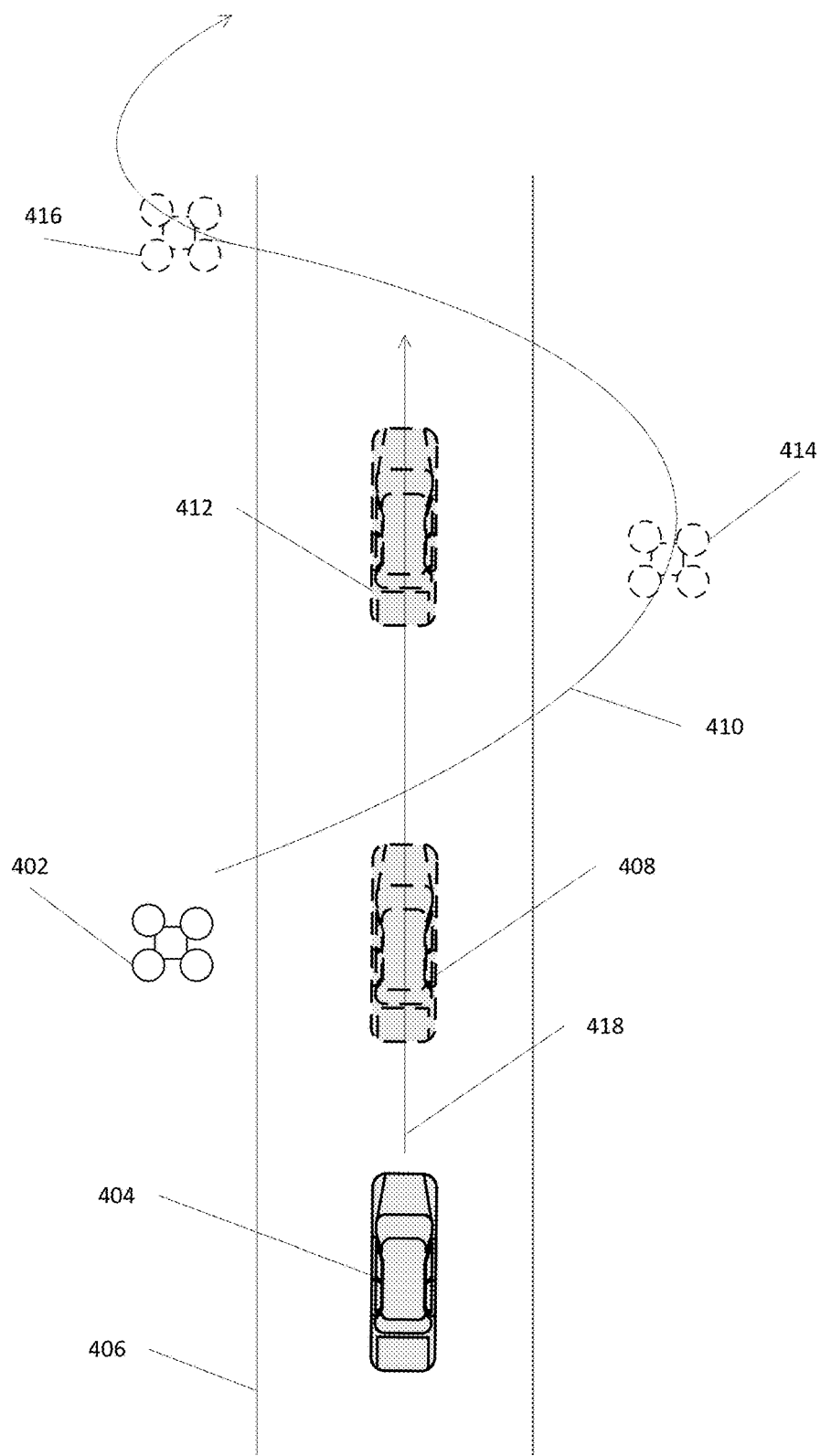
FIG. 4 illustrates an example of a leading drone executing a zig zag leading drone path relative to a base station path.

FIG. 4 illustrates an example of a leading drone 402 executing a zig zag leading drone path 410 relative to a straight base station path. The base station 404 may be anticipated to traverse a base station path 418 with at least two base station future locations 408, 412. The base station path may be bound by a geographic landmark, such as a road 406. The leading drone 402 may be configured to traverse a leading drone path 410 with at least two leading drone future locations 414, 416.

The leading drone path 410 may be along a zig zag pattern relative to the base station path 418 and not be parallel to the base station path 418. The leading drone future location 414 may be to one side of the base station 404 when anticipated to be at a base station future location 414 and then, later along the leading drone path 410, the leading drone future location 416 may be to another side of the base station 404.

Figure 5:
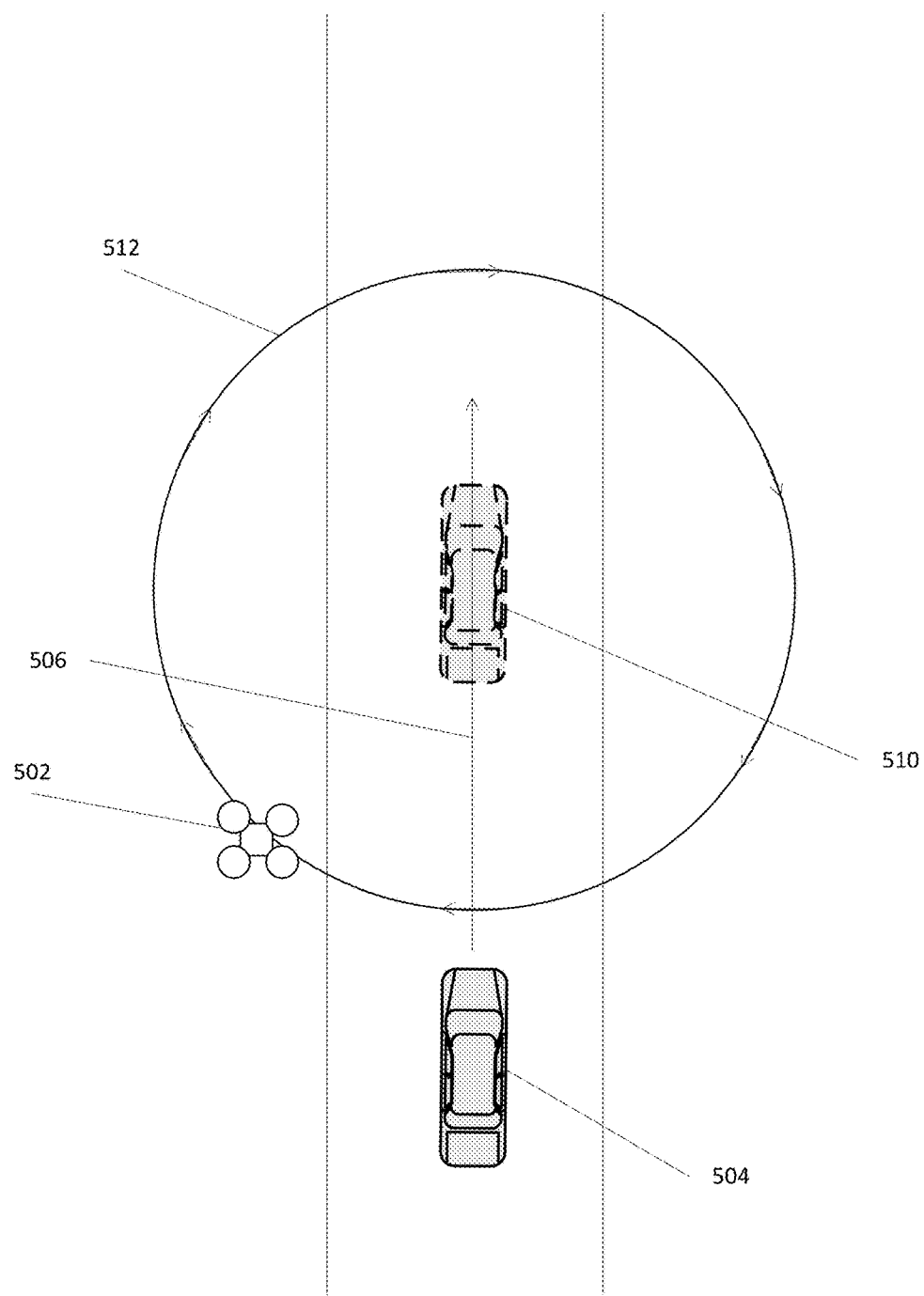
FIG. 5 illustrates an example of a leading drone executing a circling leading drone path.

FIG. 5 illustrates an example of a leading drone 502 executing a circling leading drone path 510. The circling leading drone path 510 may include a circular pattern that maintains a circular relative orientation over time from anticipated base station future locations 510 as the base station 504 traverses the base station path 506. Advantageously, the circling leading drone path 512 may focus a sensor to collect sensor data of the center region of the circle formed by the circling drone path for various perspective sensor sweeps of an area ahead of the base station 504 as the base station traverses the base station path 506.

Figure 6:
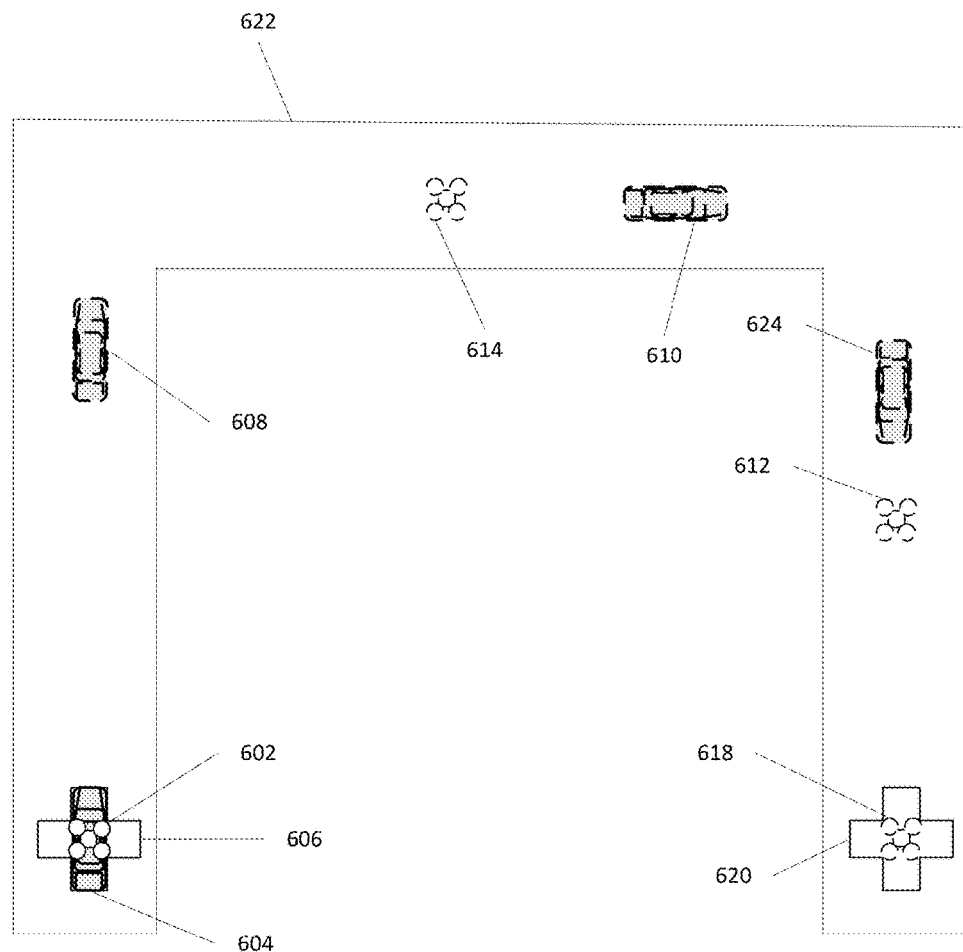
FIG. 6 illustrates an example of a leading drone traversing a base station path ahead of the base station.

FIG. 6 illustrates an example of a leading drone 602 traversing a base station path ahead of the base station 604. The base station 604 may traverse a base station path that includes base station future locations from the start position 606 to the end position 620 along the road 622. The leading drone 602 may traverse a leading drone path from the start position 606 to the end position 620 along a leading drone path with leading drone future locations 614, 620, 612 that do not all maintain a set distance from the base station future locations 608, 624, 610, while the base station 604 traverses its base station path. Although a set end position is illustrated, end positions may be modified or set dynamically as the base station operates, such as being set by the base station navigational module or as anticipated by a leading drone.

The leading drone 602 may traverse a leading drone path that first entirely traverses the road 622 from the start position 606 to the end position 620 and then returns to maintain a set distance ahead of the base station 604 as the base station 604 completes its traversal from the start position 606 to the end position 620. For example, at a first time after the base station moves from the start position 606, the leading drone 602 may be configured to be at a first leading drone future location 614 while the base station may be anticipated to be at a first base station future location 608. At a second time later than the first time, the leading drone 602 may be configured to have traversed to a second leading drone future location 618 that is over the end position 620 while the base station is at a second base station future location 610. At a third time later than the second time, the leading drone 612 may be at a third leading drone future location 612 ahead of the base station 604 when the base station is anticipated to be at a third base station future location 624. The leading drone 602 may then be configured to traverse a portion of the leading drone path that maintains a set distance ahead of the base station 604 until the base station 604 reaches the end position 620.

Figure 7:
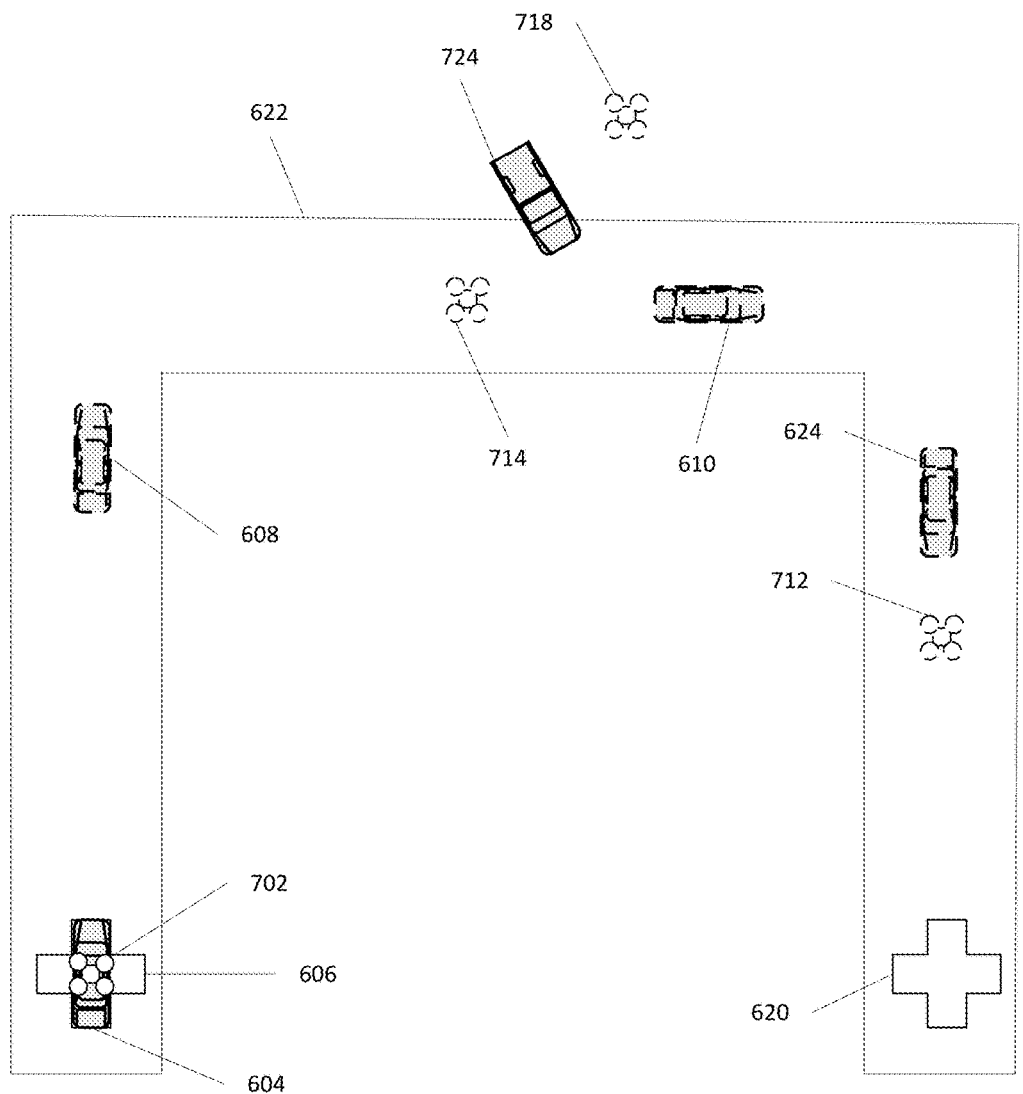
FIG. 7 illustrates an example of a trigger event along a leading drone path.

FIG. 7 illustrates an example of a leading drone 702 performing a triggered task. The trigger may be any event whose occurrence prompts the leading drone 702 to perform a task that the leading drone would otherwise not perform without trigger occurrence. The task may reconfigure the leading drone to adopt a new leading drone path, perform a new task or to modify the previous leading drone path or task prior to detection of the trigger.

Similar to FIG. 6, in FIG. 7 the base station 604 may traverse a base station path that includes base station future locations from the start position 606 to the end position 620 along the road 622. The leading drone 702 may traverse a leading drone path from the start position 606 to the end position 620 along a leading drone path initially as described in connection with FIG. 6.

However, as illustrated in FIG. 7 referencing the discussion of FIG. 6, at the first time, the leading drone 702 may be configured to be at a first leading drone future location 714 and the base station may be anticipated to be at a first base station future location 608. When at the first leading drone future location 714, the leading drone 702 may detect an unidentified vehicle 724 using sensors onboard the leading drone. The detection of the unidentified vehicle may be a trigger event which reconfigures the leading drone to perform a task to investigate the unidentified vehicle rather than to move to the end position 620 directly. As part of performance of the triggered task, the leading drone 602 may be configured to notify the base station of the trigger event and to move to a second leading drone future location 618 to investigate the unidentified vehicle 724 from a different perspective than the perspective afforded at the first leading drone future location 714. The performance of the triggered task may be in progress at the second time. After the triggered task is complete, at the third time, the leading drone 702 may be at a third leading drone future location 712, which is ahead of the base station 604 when the base station 604 is anticipated to be at a third base station future location 624. The leading drone 702 may then be configured to maintain a set distance ahead of the base station 604 until the base station 604 reaches the end position 620.

Figure 8:
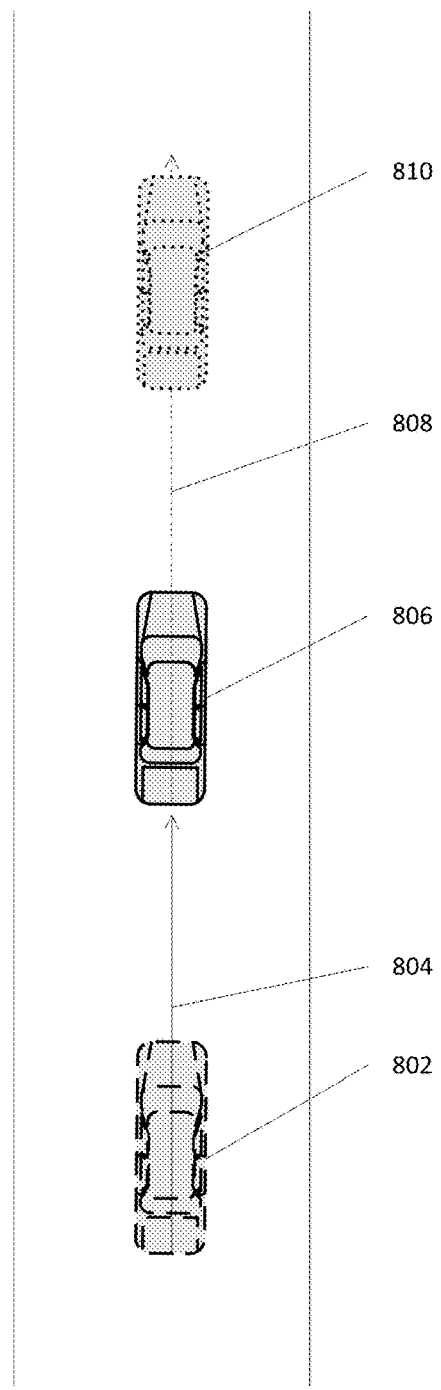
FIG. 8 illustrates features of base station future location prediction.

FIG. 8 illustrates features of base station future location prediction. As discussed above, anticipation by base station future location prediction may be contrasted with anticipation by predetermined base station future locations for traversal at future times. The base station's anticipated base station path may be predicted from determining a difference between base station current location and base station past location(s) during an interval of time (such as over the last minute) and extending that difference from the current location for a traversal across the interval of time in the future.

As illustrated in FIG. 8, the base station 806 may be at a base station current location relative to a base station past location 802 and an anticipated base station future location 810. The difference between the base station past location 802 and the base station current location 806 may be represented by a past vector 804 of a distance (illustrated as the length of the past vector 804) and a direction (illustrated as the arrow at the end of the past vector 804) over a past period of time (e.g., 10 seconds past). The parameters of the past vector 804 (e.g., distance and direction) may be applied to the current location of the base station 806 as a future vector 808 that includes a distance (illustrated with the length of the future vector 808) and a direction (illustrated with an arrow at the end of the future vector 808) over a future period of time of the same duration as the past period of time (e.g., 10 seconds in the future). Accordingly, a predicted (e.g., anticipated) base station future location 810 may be determined as the end point of the future vector 808.

Figure 9:
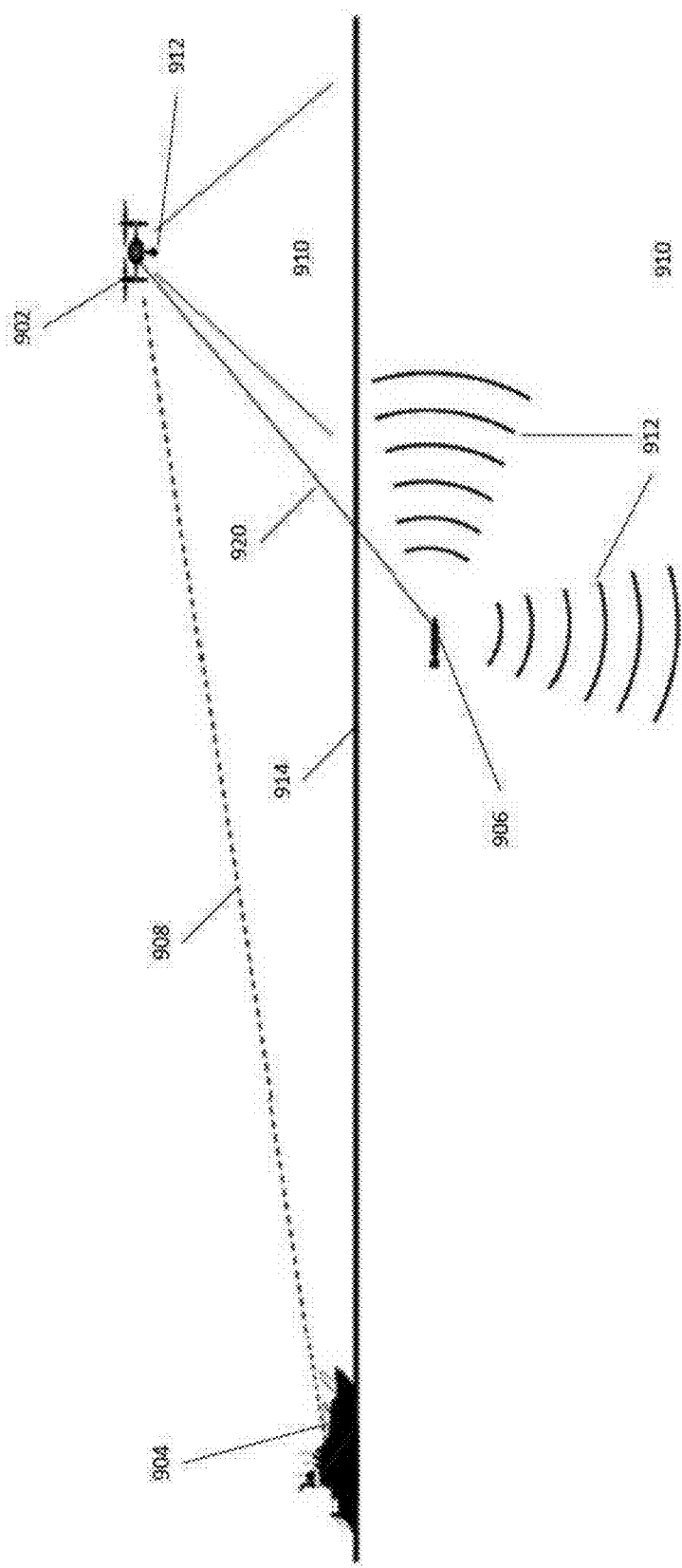
FIG. 9 illustrates an example of a leading drone interacting with a sensor drone.

FIG. 9 illustrates an example of a leading drone 902 with a sensor drone 906. The leading drone 902 may communicate with a base station 904 (in the form of a watercraft on a water surface 914) via a leading drone communication link 908. Although the base station is illustrated as a watercraft in FIG. 9, the base station can be in any form factor that can establish a communication link 110 with the leading drone, such as a hand/mobile device, personal computer, vehicle, or airplane.

The leading drone communication link 908 may include any type of communication protocol from which devices can communicate with each other, such as one or combinations of infrared (IR) wireless communication, broadcast radio, satellite communication, microwave wireless communication, microwave radio, radio frequency, wi-fi, Bluetooth, Zigbee, GPC, GSM, RFID, OFDM or the like.

The leading drone 902 may have various sensors connected to it for data collection. For example, photographic cameras, video cameras, infra-red cameras, multispectral cameras, lidar, radio transceivers, and sonar. The leading drone 902 may also be equipped with a TCAS (traffic collision avoidance system). In the illustrated embodiment, the leading drone 902 includes a video camera 912 configured to survey an area 910 underneath the leading drone 902 within a field of view of the camera 912.

The leading drone 902 may be configured to move to leading drone future locations along a leading drone path based on base station future locations, which may be along a base station path. Accordingly, the leading drone may remain ahead of a base station while the base station is moving, rather than behind or alongside a moving base station. Also, the leading drone 102 may autonomously remain in a position at a set distance ahead of the base station 904 based on where the base station 104 will (or is anticipated to) be, rather than where the base station 904 is or has been.

The leading drone 902 may communicate with a sensor drone 906 via a sensor drone communication link 920 that may be in the form of a cable wire 920. The sensor drone 906 may be underwater while the leading drone 902 is aerial. The sensor drone 906 may include any form of sensor external to the leading drone 902 from where the leading drone 902 can collect sensor data that the leading drone 902 would otherwise not have collected from sensors on the leading drone 902.

The sensor drone communication link 920 may additionally or optionally include any type of wireless communication protocol from which devices can communicate with each other, such as one or combinations of infrared (IR) wireless communication, broadcast radio, satellite communication, microwave wireless communication, microwave radio, radio frequency, wi-fi, Bluetooth, Zigbee, GPC, GSM, RFID, OFDM or the like. In the illustrated embodiment of FIG. 9, the sensor drone is physically connected with the leading drone via a cable wire 920 and the sensor drone communication link includes communication protocols from which devices can communicate over the cable wire 920. In certain embodiments, the wired sensor drone communication link 920 may also supply power to the sensor drone 906.

The sensor drone 906 may be propelled through the water by being passively dragged by a moving leading drone 902 via the cable wire 920. Optionally, the sensor drone 906 may also be able to actively move via self propulsion, such as via propellers on the sensor drone 906 that can propel the sensor drone 906 through the water. The self propulsion may be automated without input external to the sensor drone 906 or may be actively controlled by input external to the sensor drone 906 such as from the leading drone 902 (via the wired sensor drone communication link 920 or a wireless sensor drone communication link) and/or from the base station (via the leading drone communication link and the wired sensor drone communication link 920 or wireless sensor drone communication link).

The sensor drone 906 may have various sensors connected to it for data collection. For example, photographic cameras, video cameras, infra-red cameras, multispectral cameras, lidar, radio transceivers, or sonar. In the illustrated embodiment, the leading drone 902 includes a sonar configured to survey an area around the leading drone 902 using active sonar pulses 912.

Accordingly, the aerial leading drone 902 may be configured to collect aerial sensor data from a target location 910 (whether above or underwater, e.g., aerial view of a school of fish), while the submersed sensor drone 906 is configured to collected underwater sensor data from the target location 910. The submersed sensor drone 906 may be configured to send the underwater sensor data to the aerial leading drone 902 (e.g., via the sensor drone communication link 920). This underwater sensor data may be sensor data that the aerial drone may not otherwise have access to, due to reasons such as being underwater or use of sensors specific for underwater sensing. The aerial leading drone 902 may be configured to produce target location data from the aerial sensor data and the underwater sensor data.

In certain embodiments, the submersed sensor drone 906 may be configured to selectively travel closer to the surface of the water or further from the surface of the water to reduce friction during underwater travel, depending on the condition of the water.

Figure 10:
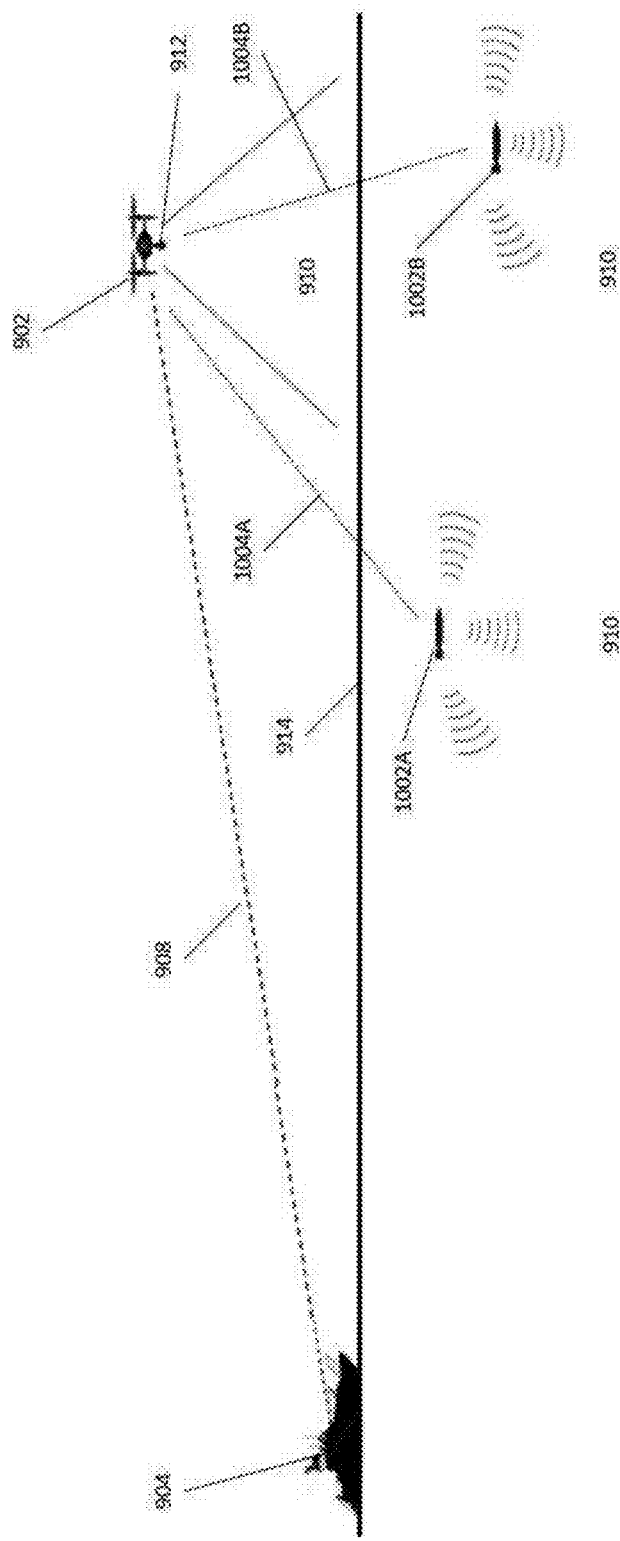
FIG. 10 illustrates an example of a leading drone communicating with multiple sensor drones.

FIG. 10 illustrates an example of the leading drone 902 communicating with multiple sensor drones 1002A, 1002B. FIG. 10 is similar to FIG. 9 except that in FIG. 10 the leading drone 902 communicates wirelessly with two sensor drones 1002A, 1002B, over wireless sensor drone communication links 1004A, 1004B.

Each of the sensor drones 1002A, 1004B may be self propelled and configured to collect underwater sensor data from the vicinity of the target area 910. Each of the sensor drones 1002A, 1004B may communicate over wireless sensor drone communication links 1004A, 1004B with the sensor drone 902. In certain embodiments, the wireless sensor drone communication links 1004A, 1004B may have a limited range from the sensor drone 1002A, 1002B from which they are centered on. The wireless sensor drone communication link 1004A may be established when the leading drone moves within range of the wireless sensor drone communication link 1004A centered on the sensor drone 1002A. Also, the wireless sensor drone communication link 1004B may be established when the leading drone moves within range of the wireless sensor drone communication link 1004B centered on the sensor drone 1002B.

Accordingly, the single aerial leading drone 902 may interact with multiple sensor drones 1002A, 1002B when in range of both sensor drone communication links 1004A, 1004B. The submersed sensor drones 1002A, 1002B may be configured to send underwater sensor data to the aerial leading drone 902. The aerial leading drone 902 may be configured to produce target location data from the aerial sensor data (collected from the aerial leading drone) and the underwater sensor data.

Figure 11:
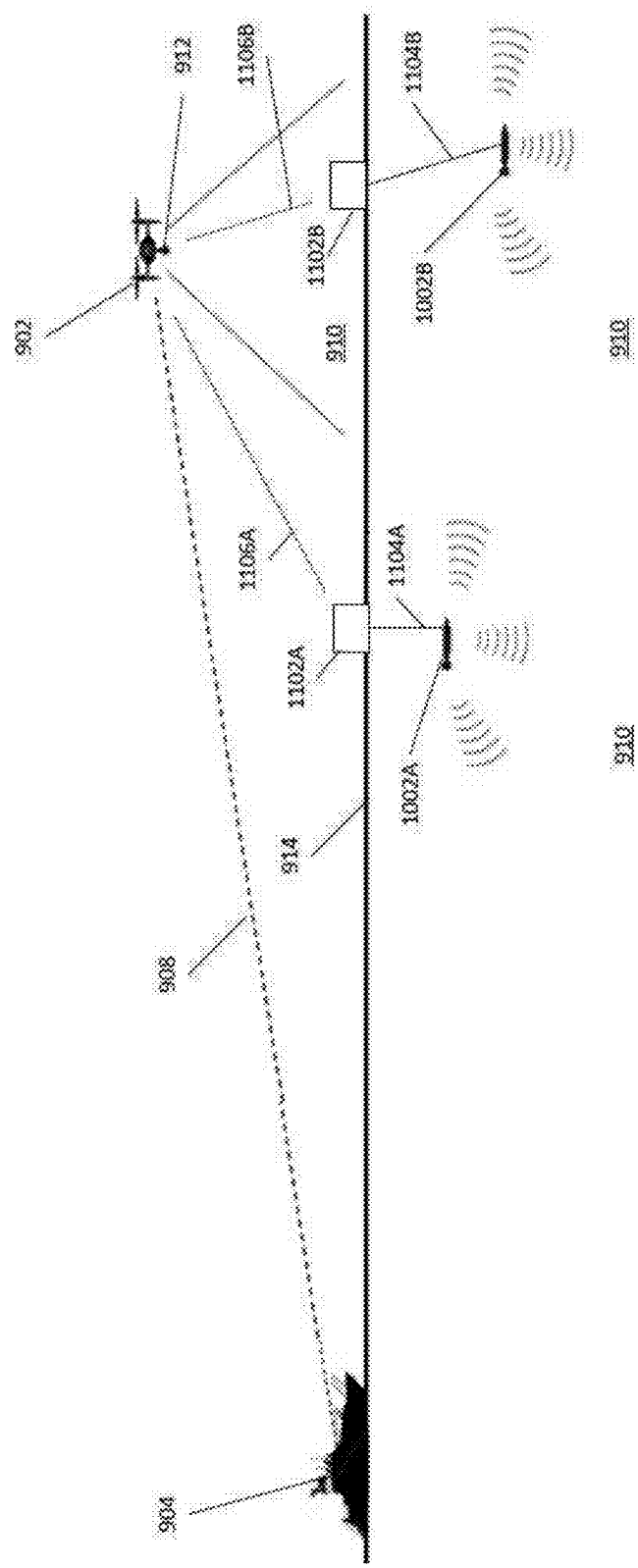
FIG. 11 illustrates an example of a leading drone communicating with multiple sensor drones tethered to communication relays.

FIG. 11 illustrates an example of the leading drone 902 communicating with the multiple sensor drones 1002A, 1002B tethered to communication relays 1102A, 1102B. These communication relays may float on the water's surface 914. FIG. 11 is similar to FIG. 10 except that in FIG. 11 the leading drone 902 communicates wirelessly with two sensor drones 1002A, 1002B via the communication relays 1102A, 1102B. Each communication relay may include an antenna and a flotation device that keeps the antenna near the surface of the water 914.

The communication relay 1102A may communicate with the sensor drone 1102A via an underwater relay communication link 1104A and the communication relay 1102B may communicate with the sensor drone 1002B via an underwater relay communication link 1104B. The underwater relay communication links 1104A, 1104B may be over a physical cable (but may optionally be wireless in certain embodiments). The leading drone 902 may communicate with the communication relay 1102A via an aerial relay communication link 1106A. Also, the leading drone 902 may communicate with the communication relay 1102B via an aerial relay communication link 1106B. The aerial relay communication links 1106A, 1106B may be wireless. The aerial relay communication links 1106A, 1106B and the underwater relay communication links 1104A, 1104B may include any type of communication protocol from which devices can communicate with each other, as discussed above. The combination of underwater relay communication links 1104A, 1104B and aerial relay communication links 1106A, 1106B may function as sensor drone communication links between the respective sensor drones 1002A, 1002B and the leading drone 902.

Advantageously, the communication relays 1102A, 1102B, may improve communication between the leading drone 902 and sensor drones 1102A, 1102B by translating between communication protocols that are more amenable for underwater communication with the sensor drones (via the underwater relay communication links 1104A, 1104B) and communication protocols that are more amenable for aerial communications (via the aerial relay communication links 1106A, 1106B).

Figure 12:
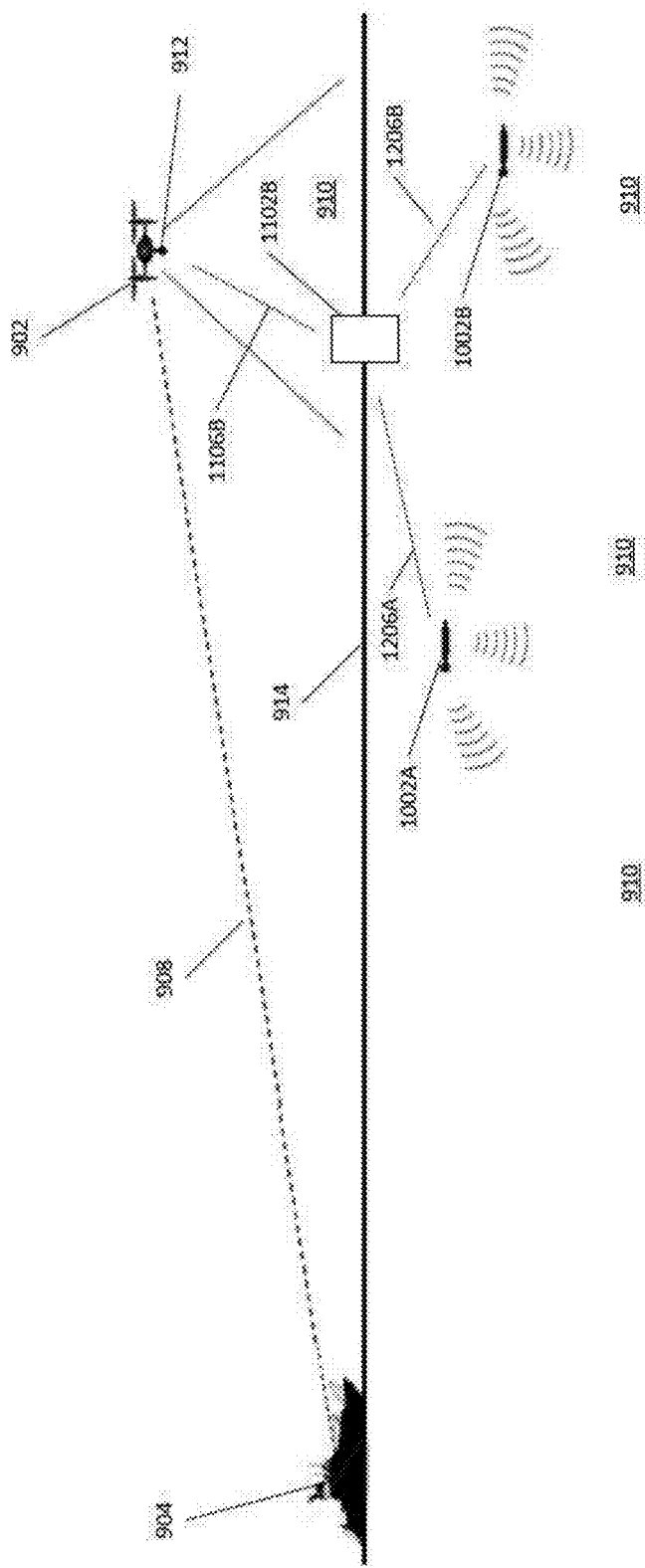
FIG. 12 illustrates an example of a leading drone communicating with a communication relay servicing multiple sensor drones.

FIG. 12 illustrates an example of the leading drone 902 communicating with the communication relay 1102B servicing multiple sensor drones 1002A, 1102B. FIG. 12 is similar to FIG. 11 except that in FIG. 12 the communication relay 1102B communicates wirelessly with the two sensor drones 1102A, 1102B over wireless underwater relay communication links 1206A, 1206B. The combination of underwater relay communication links 1206A, 1206B and aerial relay communication link 1106B may function as sensor drone communication links between the respective sensor drones 1002A, 1002B and the leading drone 902.

Advantageously, the single communication relay 1102B, may improve communication between the leading drone 902 and sensor drones 1102A, 1102B by translating between communication protocols that are more amenable for underwater communication with the sensor drones (via the wireless underwater relay communication links 1206A, 1206B) and communication protocols that are more amenable for aerial communications (via the aerial relay communication link 1106B).

Figure 13:
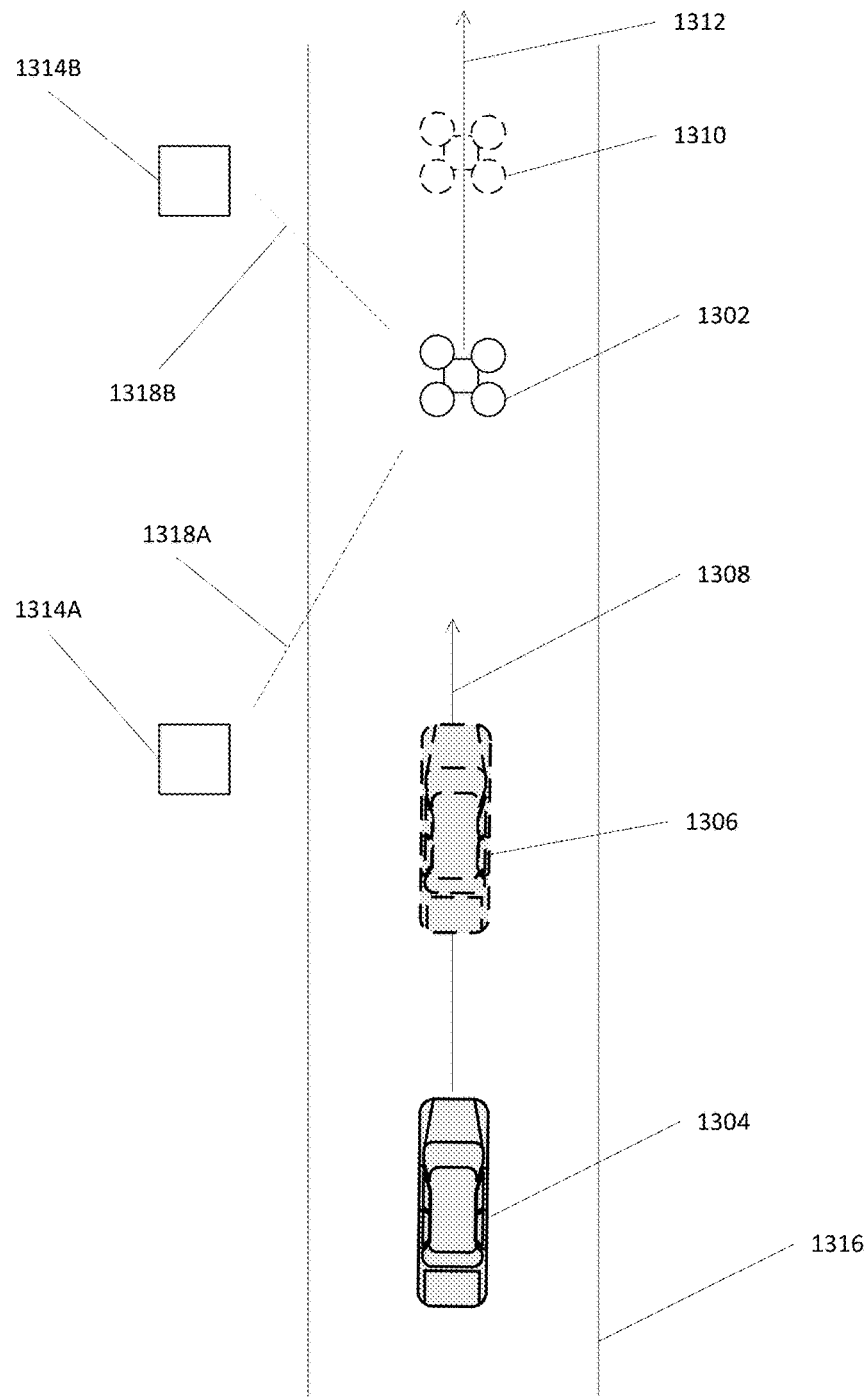
FIG. 13 illustrates an example of a leading drone communicating with stationary sensor drones.

FIG. 13 illustrates an example of a leading drone communicating with stationary sensor drones. As introduced above, the base station 1304 may be anticipated to traverse a base station path 1308 with at least one base station location 1306 along the base station path 1308. The base station path 1308 may be along a road 1316 or other geographic landmark. The leading drone 1302 may be configured to traverse a leading drone path 1312 with at least one relay drone future location 1310. The leading drone 1302 traversing the leading drone path 1312 may be ahead of the base station 1304 in the direction of the base station path 1308 (as indicated with the arrow of the base station path 1308).

The sensor drones 1314A, 1314B may be located proximate to the road 1316 and may be stationary while collecting sensor data from the vicinity of the sensor drones 1314A, 1314B. Each of the sensor drones 1314A, 1314B may communicate over wireless sensor drone communication links 1318A, 1318B with the leading drone 1302. Current sensor data and/or aggregated historical sensor data may be sent to the leading drone 1302 when the sensor drone communication links 1318A, 1318B are established with the leading drone 1302. The wireless sensor drone communication links 1318A, 1318B may have a limited range from the sensor drones 1314A, 1314B, from which they are centered on. The wireless sensor drone communication link 1318A may be established when the leading drone moves within range of the wireless sensor drone communication link 1318A centered on the sensor drone 1314A. Also, the wireless sensor drone communication link 1318B may be established when the leading drone moves within range of the wireless sensor drone communication link 1318B centered on the sensor drone 1314B.

Advantageously, a stationary sensor drone 1314A, 1314B may collect sensor data, with encoded sensor information, over time and send the aggregated sensor drone sensor data to the leading drone 1302 as the leading drone travels within range of the stationary sensor drone's sensor drone communication link. Accordingly, the leading drone 1302 may collect historical sensor data from the stationary sensor drone 1314A, 1314B that otherwise would not be available to the leading drone 1302 due to the leading drone 1302 not having access to sensors in the vicinity of the sensor drone 1314A, 1314B during the time at which the sensor drone 1314A, 1314B was collecting sensor data.

Figure 14:
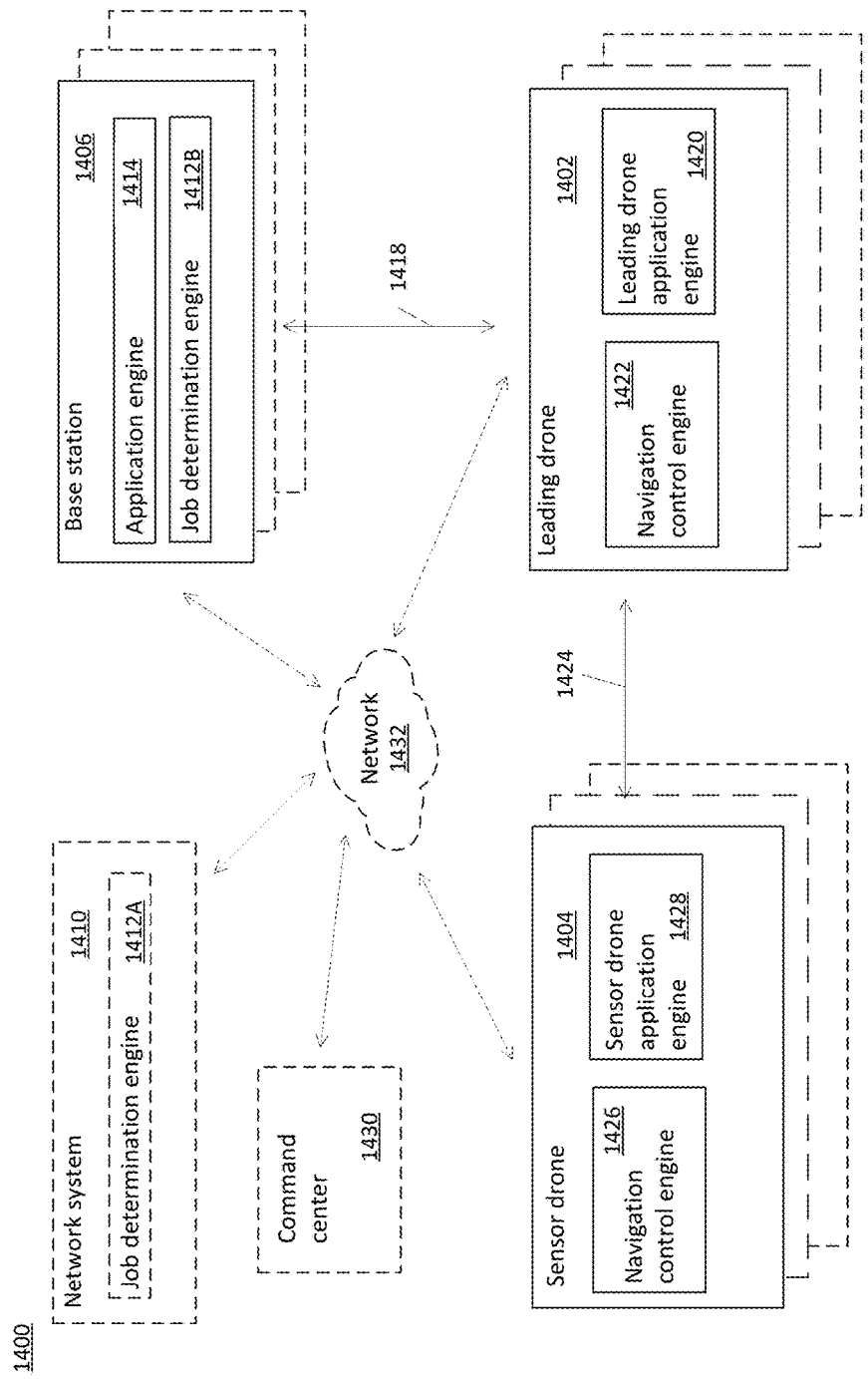
FIG. 14 is a block diagram of example systems utilized in a leading drone system.

FIG. 14 is a block diagram of example systems utilized in a leading drone system. The block diagram 1400 includes at least one base station 1406 in communication with at least one leading drone 1402 and at least one sensor drone 1404. The system of the base stations 1406, leading drones 1402 and sensor drones 1404 may be termed as a leading drone network. Optionally, the nodes (base stations, leading drones, sensor drones) of the leading drone network may interact externally with a network system 1410 and command center 1430 over a network 1432, such as the Internet. In the illustrated embodiment of FIG. 14, each of the base station, leading drone, and sensor drone are illustrated with receding boxes to note that there may be multiple base stations, leading drones, and/or sensor drones networked and operating together.

The leading drone 1402 can be in communication with at least one sensor drone 1404, at least one base station 1406, and/or with other leading drones 1402. Additionally, the leading drone 1402 and/or the sensor drone 1404 can be optionally in communication with the network system 1410 or the command center 1430 (e.g., over a network 1432, such as the Internet, or through an intermediate system). The network system 1410, command center 1430 and/or the base station 1406 can determine sensor drone control information, encoded in a sensor drone control signal, describing one or more tasks for performance by the sensor drone (such as usage of a particular sensor, parameters for a trigger, or task(s) to perform upon occurrence of a trigger). The network system 1410, command center 1430 and/or the base station 1406 can also determine leading drone control information, encoded in a leading drone control signal, describing one or more tasks (such as a navigational pattern, usage of a particular sensor, parameters for a trigger, or tasks to perform upon occurrence of a trigger) for performance by the leading drone.

The network system 1410 and/or the base station 1406 can include a job determination engine 1412A, 142B that can receive, or obtain, information describing tasks or triggers, and determine information for performance of the tasks or identification of triggers. In certain embodiments, the job determination engine may include a repository, such as a data store, that includes various triggers and tasks that may be performed by a leading drone or a sensor drone, along with associated metadata for the triggers or tasks.

The job determination engine 1412A, 1412B can communicate with the application engine 1414 for the application engine 1414 to generate interactive user interfaces (e.g., web pages to be rendered by a base station) for presentation on a base station 1406 (e.g., on user interface of the base station). Via the user interface, a user of the base station 1406 can assign tasks or identify triggers to the leading drone 1402 and/or sensor drone 1404 and provide information, such as parameters, associated with a task or trigger.

In certain embodiments, a base station 1406 does not communicate with the network system 1410 and utilizes a job determination engine 1412B locally rather than a remote job determination engine 1412A hosted on the network system for generation of a control signal.

For instance, a user, via the user interface of the application engine 1414 at the base station 1406 can assign a task to a leading drone 1402 for performance upon detecting a trigger. The trigger may be an event that occurs while the leading drone 1402 is operating that reconfigures the leading drone 1402 to perform a triggered task. For example, the trigger event may be detecting a specific property or location that the leading drone 1404 may encounter while traversing its leading drone path. The triggered task may be to adopt a new leading drone path (e.g., to collect sensor data while circling the specific property or location).

The application engine 142 can process the job information and generate control signals that may be sent to the leading drone as commands for the leading drone 1402 and/or sensor drone 1404. For instance, the control signal may encode control information that specifies triggers or tasks for the leading drone. The control information may include a task that details the leading drone path for the leading drone 1402 based on an anticipated base station path. For example, the control information can command the leading drone to navigate according to a zig-zag pattern across the base station path.

The leading drone 1402 can receive the control signal from the base station 1406 via a leading drone communication link 1418, discussed further above. This leading drone communication link 1418 may be over a wireless or a wired connection, and may be effectuated using all directional antennas, all omnidirectional antennas, or a combination of omnidirectional and directional antennas. The control signal may include leading drone control information that controls an aspect of the leading drone 1402 or commissions the leading drone 1402 to perform a task, such as to navigate according to a leading drone path that zig zags across the base station path.

The leading drone 1402 may include a leading drone application engine 1420 that can configure the leading drone 1402 to execute the task identifiable from the leading drone control signal. The leading drone control signal may also include a sensor drone control signal, where the leading drone 1402 can be configured to pass the sensor drone control information, encoded in a sensor drone control signal, to the sensor drone 1404 via a sensor drone communication link 1424.

The leading drone 1402 can include a navigation control engine 1412 that can manage the propulsion mechanisms (e.g., motors, rotors, propellers, and so on) included in the leading drone 1402 to effect the task identified in the leading drone control information. Optionally, the leading drone application engine 102 can provide commands (e.g., high level commands) to the navigation control engine 1412, which can interpret or override the leading drone control information from the leading drone control signal. For instance, the leading drone application engine 1420 can indicate that the leading drone 1402 is to descend to land at a location due to the leading drone 1402 being damaged, and the navigation control engine 1422 can ensure that the leading drone 1402 descends in a substantially vertical direction.

After executing, or as part of, executing the task detailed in the leading drone control information, the leading drone 1402 can send a data signal to the base station 1406. This process may be iterative, such as where the base station 1406 sends additional leading drone control information to the leading drone 1402, after receiving the data signal. For example, the sensor drone 1404 can provide sensor information for the base station 1406. The base station 1406 can combine the received sensor information (e.g., stitch together images, generate a 3D model of the property, and so on). Based on the combined received sensor information, the base station can send updated leading drone control information to the leading drone 1402 for a more detailed inspection of an area identified in the sensor information.

The sensor drone 1402 may include a sensor drone application engine 1420 that can configure the sensor drone to execute the task identified in the sensor drone control information received via the sensor drone communication link 1424.

Optionally, the sensor drone 1404 can include a navigation control engine 1426 that can manage the propulsion mechanisms (e.g., motors, rotors, propellers, and so on) included in the sensor drone 1426 to effect the task identified in the sensor drone control information. The sensor drone application engine 1428 can provide commands (e.g., high level commands) to the navigation control engine 1426, which can interpret or override the sensor drone control information. For instance, the sensor drone application engine 1428 can indicate that the sensor drone 1426 is to descend to land at a location due to the sensor drone 1404 being damaged, and the navigation control engine 1426 can ensure that the sensor drone 1404 descends in a substantially vertical direction.

After executing, or as part of, executing the task detailed in the sensor drone control information, the sensor drone 1404 can send a data signal to the leading drone 1402. This data signal may be relayed to the base station and/or processed by the leading drone 1402. This process may be iterative, such as where the base station 1406 or leading drone 1402 sends additional sensor drone control information, encoded in an additional sensor drone control signal, to the sensor drone 1404 after receiving the data signal. For example, the sensor drone 1404 can provide sensor information, encoded in a data signal, to the leading drone 1402. The leading drone 1402 can combine the received sensor drone sensor information with sensor information collected at the leading drone 1402 (e.g., stitch together images, generate a 3D model of the property, and so on). Based on the combined sensor information, the leading drone can send updated sensor drone control information to the sensor drone 1404 or send an analysis of the combined sensor information to the base station 1406.

Optionally, the sensor drone 1404 and/or the leading drone 1402 may be in communication with a command center 1430 over the network 1432. The command center 1430 may directly send sensor drone control information to a sensor drone and/or leading drone or leading drone control information to a leading drone that overrides control information sent from a base station or a leading drone.

Figure 15:
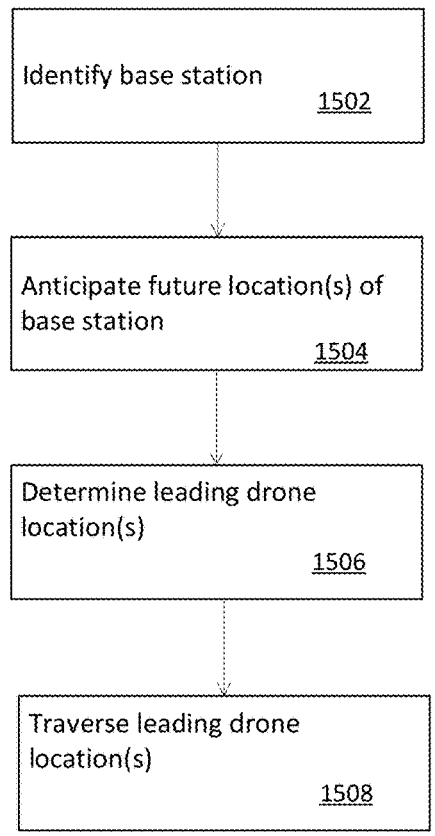
FIG. 15 is a flowchart of an example process for determining a leading drone path.

FIG. 15 is a flowchart of an example process for determining a leading drone path. The process 1500 may be performed by a leading drone, which may utilize one or more computers or processors.

The leading drone may identify a base station (block 1502) for interaction with the leading drone. The base station may be a base station from which anticipated base station future locations and associated base station path can be anticipated. The leading drone may receive a leading drone control signal that includes leading drone control information that identifies a base station to communicate (or interact) with. In certain embodiments, the leading drone control signal may be received at the leading drone from the base station identified in the leading drone control signal, such as where the base station that sent the control signal is to pair with the leading drone. In certain embodiments, the leading drone may transmit a leading drone discovery signal. The leading drone discovery signal may include information for how a base station is to send the leading drone control signal to the leading drone to identify the base station for interaction with the leading drone.

In certain embodiments, the leading drone control signal may include criteria from which the leading drone can identify a base station for interaction with the leading drone. For example, regarding a vehicular base station, the criteria may be a particular infrared signature for a vehicle detected from an infrared sensor accessible to the leading drone, a particular vehicle profile detected using edge detection of video data generated from a video camera accessible to the leading drone after a base station is identified, or a particular location signal periodically transmitted from a base station and detected from a sensor accessible to the leading drone.

The leading drone may anticipate base station future locations for the identified base station to traverse (block 1504). The anticipated base station future locations may, in the aggregate, form a base station path. A processor accessible to the relay drone may utilize the received anticipated base station future locations to autonomously construct the base station path.

In certain embodiments, the anticipated base station future locations may be predetermined and received as part of a leading drone control signal. For example, the base station may have a geospatial sensor that senses where the base station is and, based also on where its intended destination is relative to other geospatial information such as a map, a navigational module may plot a navigational path for the base station to traverse over time to arrive at the intended destination. Example navigational modules may include the Garmin® Navigator application produced by Garmin Ltd. headquartered in Olathe, Kans. or the Google® Maps Navigation application developed by Google Inc. headquartered in Mountain View, Calif.

In certain embodiments, the anticipated base station future locations may be determined on the fly or predicted. As introduced above, the base station's anticipated base station future locations along a base station path may be predicted from determining a difference between base station past and current locations during a past interval of time (such as over the last minute) and adding the difference for traversal during a future interval of time of the same duration as the past interval of time. Further discussion of predicted base station future location determination is discussed in connection with FIGS. 8 and 16.

Returning to FIG. 15, the leading drone may determine leading drone future locations for the leading drone to traverse (block 1506). The leading drone future locations may, in the aggregate, form a leading drone path. The leading drone future locations may be based on the base station future locations along the base station path. For example, the leading drone future locations may be where the base station is anticipated to be after a period of time or may be at a fixed distance ahead of the base station as the base station traverses base station future locations. The leading drone future locations may be determined completely autonomously without base station input or may be semiautonomous with base station input, via a leading drone control signal. For example, a leading drone control signal may instruct the leading drone how to determine leading drone future locations, such as to determine leading drone future locations along a pattern that zig zags across the base station path or along a pattern parallel to the base station path.

The leading drone may traverse the determined leading drone future locations (block 1508). The leading drone may traverse the leading drone future locations (and the leading drone path) by executing a navigation control engine that can manage the propulsion mechanisms (e.g., motors, rotors, propellers, and so on) included in the leading drone to traverse the leading drone path.

Figure 16:
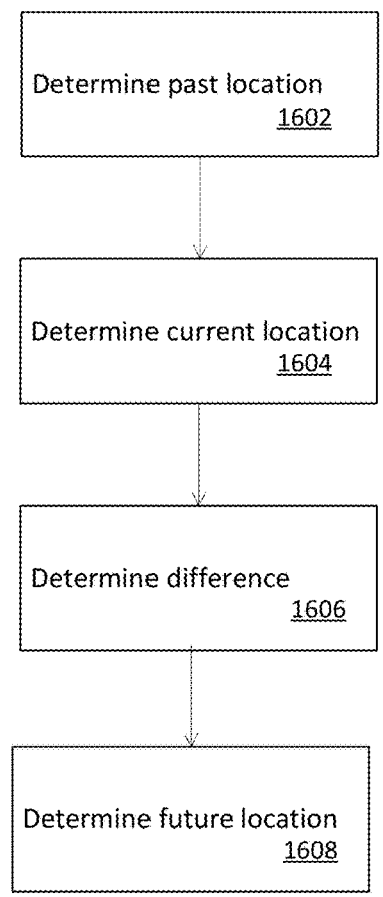
FIG. 16 is a flowchart of an example process for determining base station future locations on the fly.

FIG. 16 is a flowchart of an example process for determining (or predicting) future locations of a base station on the fly. The process 1600 may be performed by a leading drone, which may utilize one or more computers or processors.

The leading drone may identify a past location of a base station (block 1602). The past location may be detected by the leading drone, via sensors available to the leading drone, at a past time. Alternatively, the past location may be received by the leading drone, such as via a leading drone control signal.

The leading drone may identify a current location of a base station (block 1604). The current location may be detected by the leading drone, via sensors available to the leading drone, at a current time. Alternatively, the current location may be received by the leading drone, such as via a leading drone control signal.

The leading drone may determine a difference between the past location and the current location of the base station (block 1606). The difference may include both a direction and a quantity of displacement over a standard interval of time. For example, the difference may be 5 meters per second in a north by northwest direction (with no change along a vertical axis). Stated another way, referring to FIG. 8, the difference between a past base station location and a current base station location may be determined to include a past vector 804 of a distance and a direction over a past period of time (e.g., 10 seconds past).

Returning to FIG. 16, the leading drone may determine a future location (block 1608). The difference determined in block 1606 may be applied to the current location of the leading drone to determine the leading drone future location. For example, referring to FIG. 8, the parameters of the past vector 804 (e.g., distance and direction) may be applied to the current location of the base station 806 as a future vector that includes the same distance and direction over a future period of time of the same duration as the past period of time (e.g., 10 seconds). Accordingly, a predicted (e.g., anticipated) future base station location may be determined as the end point of the future vector. Additional leading drone future locations at future intervals of time may be plotted similarly where the future vector is applied iteratively to base station future locations.

Figure 17:
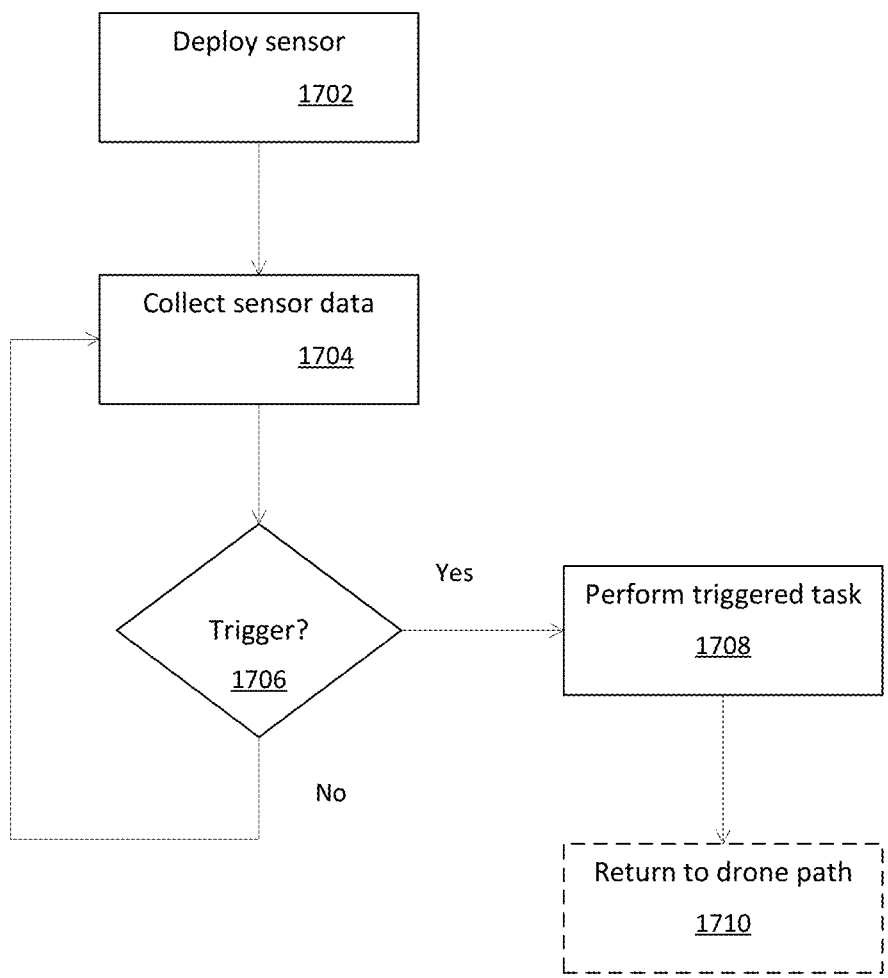
FIG. 17 is a flowchart of an example process for a triggered task.

FIG. 17 is a flowchart of an example process for trigger investigation. The process 1600 may be performed by a leading drone, which may utilize one or more computers or processors.

The leading drone may deploy a sensor accessible to the leading drone at block 1702. The sensor may be onboard the leading drone. The sensor may be any sensor configured to collect sensor data from which a trigger event can be detected. For example, the sensor may be a video camera configured to collect video sensor data.

The leading drone may collect sensor data from the sensor at block 1704. The sensor data may be data generated from the sensor during the sensor's deployment. For example, the sensor data may be video data generated from a deployed video camera on the leading drone.

The leading drone may process the sensor data to determine whether a trigger event has occurred based on the sensor data at block 1706. The sensor data may be processed using a processor onboard or accessible to the leading drone. The trigger may be an event that initiates a triggered task. For example, the sensor data may be video data from which an unidentified vehicle may be identified. The unidentified vehicle may be identified via edge detection or via an unknown vehicle profile or signature detected in frames of the video data. The identification of the unidentified vehicle may be a trigger event.

If a trigger event is identified, the leading drone may perform a triggered task at block 1708. The triggered task may be any task for which the leading drone is configured to perform based on the trigger. For example, the task may be to send a detection signal to a base station indicating trigger event occurrence and/or, when the trigger event is detection of an unknown vehicle, to circle the unknown vehicle.

If a trigger is not identified, the leading drone may return to block 1704 and continue to collect sensor data.

Optionally, the leading drone may return to the leading drone path along which the leading drone may have been traveling during deployment of the sensor in block 1710. The leading drone may return to the leading drone path at the leading drone future location after interruption by the triggered task. Alternatively, the leading drone may return to the leading drone path at a location designated for the leading drone to traverse at the time at which the triggered task is complete.

Figure 18:
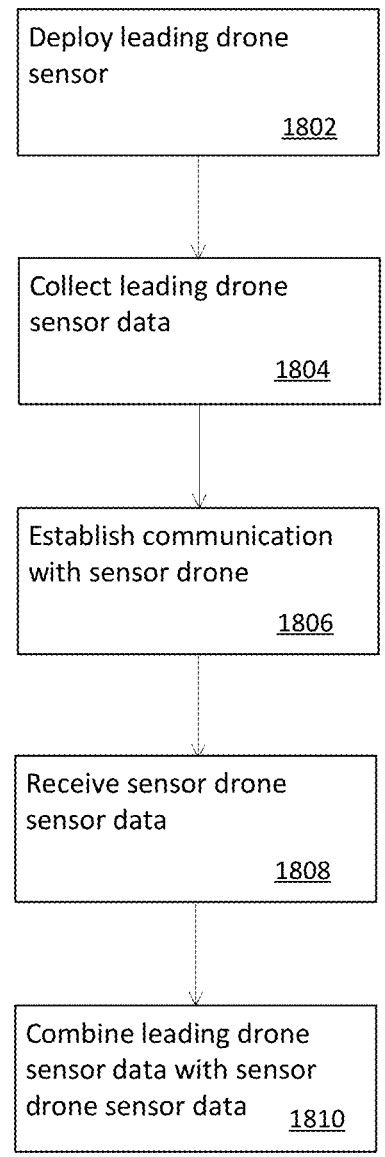
FIG. 18 is a flowchart of an example process for combining leading drone sensor data and sensor drone sensor data.

FIG. 18 is a flowchart of an example process for combining leading drone sensor data and sensor drone sensor data. The process 1800 may be performed by a leading drone, which may utilize one or more computers or processors.

The leading drone may deploy a leading drone sensor accessible to the leading drone at block 1802. The leading drone sensor may be onboard the leading drone. The leading drone sensor may be any sensor deployed from the leading drone and configured to collect sensor data. For example, the leading drone sensor may be a video camera configured to collect video sensor data.

The leading drone may collect leading drone sensor data from the leading drone sensor at block 1804. The leading drone sensor data may be data generated from the leading drone sensor during the leading drone sensor's deployment. For example, the leading drone sensor data may be video sensor data generated from a deployed video camera on the leading drone.

The leading drone may establish a sensor drone communication link with a sensor drone at block 1806. The sensor drone communication link may be established when the leading drone is in range of the sensor drone communication link, as discussed above. The sensor drone communication link may be persistent, such as when the sensor drone is at a constant distance from the leading drone as discussed in connection with FIG. 9, or may be non-persistent, as discussed for example in connection with FIG. 13.

The leading drone may receive sensor drone sensor data at block 1808. The sensor drone sensor data may be received via the sensor drone communication link. The sensor drone sensor data may be any type of sensor data collected by the sensor drone via sensors accessible to the sensor drone.

The leading drone may combine leading drone sensor data with sensor drone sensor data in block 1810. This combined sensor data includes not only leading drone sensor data, but also sensor drone sensor data that would not have been accessible to the leading drone without communication with the sensor drone. The sensor data may be combined in various ways such as by stitching together images or video to generate a 2D or 3D model of a location. Based on the combined sensor data (or sensor information), the leading drone can send mine additional insights from an area investigated by a leading drone sensor from sensor data not collected by the leading drone sensor.

Figure 19:
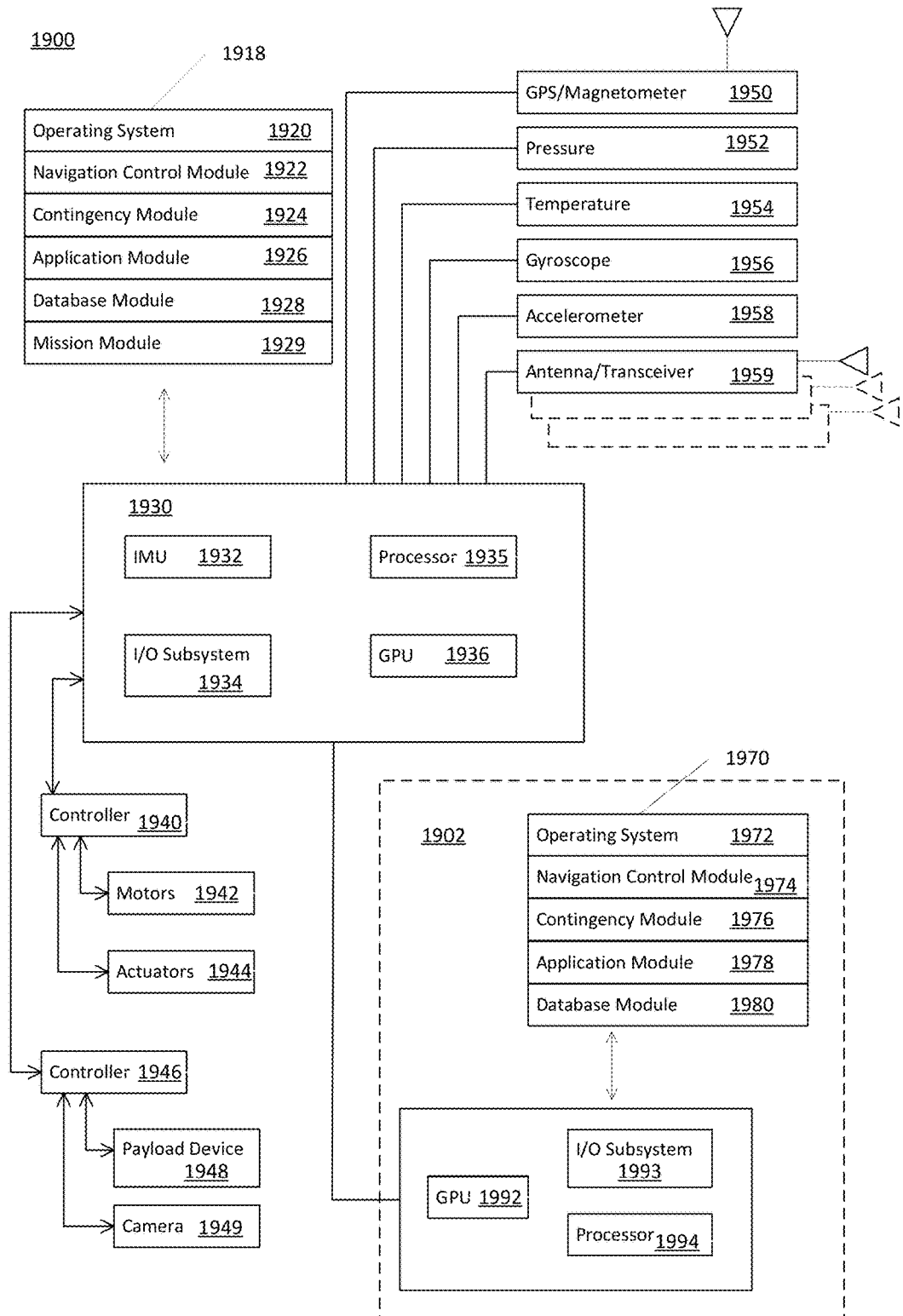
FIG. 19 illustrates a block diagram of an example system architecture for a drone.

FIG. 19 illustrates a block diagram of an example system architecture for a drone for implementing the features and processes described herein. The drone may be a leading drone or a sensor drone.

A drone primary processing system 1900 can be a system of one or more computers, or software executing on a system of one or more computers, which is in communication with, or maintains, one or more databases. The drone primary processing system 1900 can be a system of one or more processors 1935, graphics processors 1936, I/O subsystem 1934, logic circuits, analog circuits, associated volatile and/or non-volatile memory, associated input/output data ports, power ports, etc., and/or one or more software processing executing one or more processors or computers. The autopilot system 1930 includes the inertial measurement unit (IMU) 1932, processor 1935, I/O subsystem 1934, GPU 1936, and various operating system 1920, and modules 1920-1929. Memory 1918 may include non-volatile memory, such as one or more magnetic disk storage devices, solid state hard drives, or flash memory. Other volatile memory such a RAM, DRAM, SRAM may be used for temporary storage of data while the drone is operational. Databases may store information describing drone navigational operations, navigation plans, contingency events, geofence information, component information, and other information.

The drone processing system may be coupled to one or more sensors, such as GNSS receivers 1950 (e.g., a GPS, GLONASS, Galileo, or Beidou system), gyroscopes 1956, accelerometers 1958, temperature sensors 1954 pressure sensors (static or differential) 1952, current sensors, voltage sensors, magnetometer, hydrometer, and motor sensors. The drone may use an inertial measurement unit (IMU) 1932 for use in navigation of the drone. Sensors can be coupled to the processing system, or to controller boards coupled to the drone processing system. One or more communication buses, such as a CAN bus, or signal lines, may couple the various sensor and components.

Various sensors, devices, firmware and other systems may be interconnected to support multiple functions and operations of the drone. For example, the drone primary processing system 1900 may use various sensors to determine the drone's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The navigation control module (also referred to as navigation control engine) 1922 handles navigation control operations of the drone. The module interacts with one or more controllers 1940 that control operation of motors 1942 and/or actuators 1944. For example, the motors may be used for rotation of propellers, and the actuators may be used for navigation surface control such as ailerons, rudders, flaps, landing gear, and parachute deployment. The navigational control module 1922 may include a navigational module, introduced above.

The contingency module 1924 monitors and handles contingency events. For example, the contingency module may detect that the drone has crossed a border of a geofence, and then instruct the navigation control module to return to a predetermined landing location. Other contingency criteria may be the detection of a low battery or fuel state, or malfunctioning of an onboard sensor, motor, or a deviation from planned navigation. The foregoing is not meant to be limiting, as other contingency events may be detected. In some instances, if equipped on the drone, a parachute may be deployed if the motors or actuators fail.

The mission module 1929 processes the navigation plan, waypoints, and other associated information with the navigation plan. The mission module 1929 works in conjunction with the navigation control module. For example, the mission module may send information concerning the navigation plan to the navigation control module, for example lat/long waypoints, altitude, navigation velocity, so that the navigation control module can autopilot the drone.

The drone may have various devices or sensors connected to it for data collection. For example, photographic camera 1949, video cameras, infra-red cameras, multispectral cameras, lidar, radio transceiver, sonar. The drone may additionally have a TCAS (traffic collision avoidance system). Data collected by the sensors may be stored on the device collecting the data, or the data may be stored on non-volatile memory 1918 of the drone processing system 1900.

The drone processing system 1900 may be coupled to various radios, and transmitters 1959 for manual control of the drone, and for wireless or wired data transmission to and from the drone primary processing system 1900, and optionally the drone secondary processing system 1902. The drone may use one or more communications subsystems, such as a wireless communication or wired subsystem, to facilitate communication to and from the drone. Wireless communication subsystems may include radio transceivers, and infrared, optical ultrasonic, electromagnetic devices. Wired communication systems may include ports such as Ethernet, USB ports, serial ports, or other types of port to establish a wired connection to the drone with other devices, such as a ground control system, cloud-based system, or other devices, for example a mobile phone, tablet, personal computer, display monitor, other network-enabled devices. The drone may use a light-weight tethered wire to a ground base station for communication with the drone. The tethered wire may be removeably affixed to the drone, for example via a magnetic coupler.

Navigation data logs may be generated by reading various information from the drone sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, and contingency information. This foregoing is not meant to be limiting, and other data may be captured and stored in the navigation data logs. The navigation data logs may be stored on a removable media and the media installed onto the ground control system. Alternatively, the data logs may be wirelessly transmitted to the base station, command center or to the network system.

Modules, programs or instructions for performing navigation operations, contingency maneuvers, and other functions may be performed with the operating system. In some implementations, the operating system 1920 can be a real time operating system (RTOS), UNIX, LINUX, OS X, WINDOWS, ANDROID or other operating system. Additionally, other software modules and applications may run on the operating system, such as a navigation control module 1922, contingency module 1924, application module 1926, and database module 1928. Typically navigation critical functions will be performed using the drone processing system 1900. Operating system 1920 may include instructions for handling basic system services and for performing hardware dependent tasks.

In addition to the drone primary processing system 1900, a secondary processing system 1902 may be used to run another operating system to perform other functions. A drone secondary processing system 1902 can be a system of one or more computers, or software executing on a system of one or more computers, which is in communication with, or maintains, one or more databases. The drone secondary processing system 1902 can be a system of one or more processors 1994, graphics processors 1992, I/O subsystem 1993, logic circuits, analog circuits, associated volatile and/or non-volatile memory, associated input/output data ports, power ports, etc., and/or one or more software processing executing one or more processors or computers. Memory 1970 may include non-volatile memory, such as one or more magnetic disk storage devices, solid state hard drives, flash memory. Other volatile memory such a RAM, DRAM, SRAM may be used for storage of data while the drone is operational.

Ideally modules, applications and other functions running on the secondary processing system 1902 will be non-critical functions in nature, that is if the function fails, the drone will still be able to safely operate. In some implementations, the operating system 1972 can be based on real time operating system (RTOS), UNIX, LINUX, OS X, WINDOWS, ANDROID or other operating system. Additionally, other software modules and applications may run on the operating system 1972, such as an application module 1978, database module 1980, navigational control module 1974 (which may include a navigational module), and so on (e.g., modules 1972-1980). Operating system 1902 may include instructions for handling basic system services and for performing hardware dependent tasks.

Also, controllers 1946 may be used to interact and operate a payload sensor or device 1948, and other devices such as photographic camera 1949, video camera, infra-red camera, multispectral camera, stereo camera pair, lidar, radio transceiver, sonar, laser ranger, altimeter, TCAS (traffic collision avoidance system), ADS-B (Automatic dependent surveillance-broadcast) transponder. Optionally, the secondary processing system 1902 may have coupled controllers to control payload devices.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data or control signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others. While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

What is claimed is:

1. A system comprising:
   a base station in the form of a watercraft having a pre-determined path of travel for the base station to traverse over water towards a target location;
   an unmanned aerial drone is configured to receive an information on the pre-determined path of travel for the base station and autonomously calculate an aerial drone path that directly correlates with the pre-determined path of travel for the base station;
   said unmanned aerial drone is configured to autonomously travel on said aerial drone path, and wherein the unmanned aerial drone is at a fixed distance from the base station during travel;
   said unmanned aerial drone is configured to collect aerial sensor data from the target location; and
   a submersed drone to traverse underwater and physically tethered to the aerial drone and is configured to collect underwater sensor data from the target location, the submersed drone is configured to send the underwater sensor data to the aerial drone, the aerial drone is configured to produce target location data from the aerial sensor data and the underwater sensor data.

2. The system of claim 1, wherein a cable connects the submersed drone with the unmanned aerial drone.

3. The system of claim 2, wherein the unmanned aerial drone tows the submersed drone via the cable.

4. The system of claim 1, the submersed drone is configured to move along a submersed drone path based on the aerial drone path.

5. The system of claim 4, wherein the submersed drone is configured to move along the submersed drone path behind the unmanned aerial drone.

6. The system of claim 1, wherein the submersed drone is self-propelled.

7. The system of claim 1, wherein the unmanned aerial drone is configured to send the target location data to the base station.

8. The system of claim 1, wherein the submersed drone is configured to move along a submersed drone path based on a movement of the unmanned aerial drone.

9. The system of claim 1, wherein the submersed drone is configured to move to the target location.

10. The system of claim 1, wherein the unmanned aerial drone is configured to
    identify a base station configured to move from a current location;
    determine a future location of the base station; and
    move to an aerial drone location relative to the future location.

11. The system of claim 10, wherein the aerial drone location is at the future location.

12. The system of claim 10, wherein the unmanned aerial drone is configured to receive a control signal from the base station comprising the future location.

13. The system of claim 10, wherein the unmanned aerial drone is configured to determine the future location based on the current location.

* * * * *